US011669594B2

(12) United States Patent
Gibb

(10) Patent No.: US 11,669,594 B2
(45) Date of Patent: Jun. 6, 2023

(54) SYSTEMS AND METHODS FOR AUTHORIZING USER ACCESS TO RESTRICTED CONTENT

(71) Applicant: Fusion Holdings Limited, Douglas (GB)

(72) Inventor: Taylor B. Gibb, Kingsburgh (ZA)

(73) Assignee: Fusion Holdings Limited, Douglas (IM)

( * ) Notice: Subject to any disclaimer, the term of this patent is extended or adjusted under 35 U.S.C. 154(b) by 494 days.

(21) Appl. No.: 16/774,690

(22) Filed: Jan. 28, 2020

(65) Prior Publication Data

US 2020/0242212 A1 Jul. 30, 2020

(30) Foreign Application Priority Data

Jan. 30, 2019 (GB) ...................................... 1901296

(51) Int. Cl.
*G06F 21/10* (2013.01)
*G06F 21/60* (2013.01)
(Continued)

(52) U.S. Cl.
CPC ............ *G06F 21/10* (2013.01); *G06F 21/602* (2013.01); *G06F 21/6218* (2013.01);
(Continued)

(58) Field of Classification Search
CPC .... G06F 21/10; G06F 21/602; G06F 21/6218; G06F 2221/0713; G06F 2221/2141;
(Continued)

(56) References Cited

U.S. PATENT DOCUMENTS 7,610,486 B2   10/2009  Herrmann et al.
9,213,931 B1 * 12/2015  Annan .................... G06F 21/30
(Continued)

FOREIGN PATENT DOCUMENTS

AU       2020200078 A1   8/2020
CA         3069074 A1   7/2020
(Continued)

OTHER PUBLICATIONS

Search Report for UK Patent Application No. GB1901296.2, dated Feb. 22, 2022, 6 pages.
(Continued)

*Primary Examiner* — Abiy Getachew
(74) *Attorney, Agent, or Firm* — McDonnell Boehnen Hulbert & Berghoff LLP

(57) ABSTRACT

A mobile device may retrieve, from a multimedia computer, a network address at which a condition is defined. The condition may relate to authorizing access to restricted content associated with the multimedia computer. The mobile device may also retrieve details of the condition that is defined at the network address. The mobile device may prompt a user of the mobile device for permission to provide, to an authorization server, authorization information that relates to the condition. The mobile device may transmit, to the authorization server, the authorization information and a user profile identifier of the user. Based on a confirmation of the validity of the authorization information, the mobile device may receive an authorization code from the authorization server. Based on the receiving of the authorization code, the mobile device may provide a graphical user interface that provides access to the restricted content associated with the multimedia computer.

25 Claims, 13 Drawing Sheets

(51) Int. Cl.
  *G06F 21/62*     (2013.01)
  *G06K 7/14*      (2006.01)
  *H04L 67/306*    (2022.01)

(52) U.S. Cl.
  CPC .......... *G06K 7/1417* (2013.01); *H04L 67/306* (2013.01); *G06F 2221/0713* (2013.01)

(58) Field of Classification Search
  CPC ..... G06F 21/31; G06K 7/1417; H04L 67/306; H04L 63/10; H04L 63/101; H04L 63/102; H04L 9/40; H04W 12/084; H04W 12/08
  See application file for complete search history.

(56) References Cited

U.S. PATENT DOCUMENTS

| | | | |
|---|---|---|---|
| 11,115,405 B2* | 9/2021 | Kuper | H04L 63/10 |
| 11,271,925 B1* | 3/2022 | Ramineni | H04L 63/083 |
| 2003/0046550 A1 | 3/2003 | Carroll et al. | |
| 2006/0085862 A1* | 4/2006 | Witt | H04N 19/136 726/28 |
| 2007/0186106 A1 | 8/2007 | Ting et al. | |
| 2015/0113604 A1 | 4/2015 | Oyman | |
| 2017/0161281 A1* | 6/2017 | Bhartia | H04W 4/21 |
| 2018/0337784 A1* | 11/2018 | Jain | H04W 12/084 |
| 2020/0242212 A1 | 7/2020 | Gibb | |

FOREIGN PATENT DOCUMENTS

| | | |
|---|---|---|
| EP | 1566939 B1 | 10/2011 |
| EP | 3691319 A1 | 8/2020 |
| GB | 2580934 A | 8/2020 |
| WO | 2006113834 A2 | 10/2006 |
| WO | 2006113834 A3 | 10/2006 |

OTHER PUBLICATIONS

Search Report for Australian Patent Application No. 2020200078, dated Aug. 6, 2020, 5 pages.
Search Report for European Patent Application No. 20153430.2, dated Aug. 5, 2020, 3 pages.
Search Report for UK Patent Application No. GB1901296.2, dated Jun. 1, 2020, 4 pages.
Examination Search Report for Canadian Patent Application No. 3,069,074, dated Feb. 23, 2022, 6 pages.
Notice of acceptance for Australian Patent Application No. 2020200078, dated Jul. 21, 2021, 3 pages.
Examination Report for Canadian Patent Application No. 3,069,074, dated Apr. 21, 2021, 4 pages.
Canadain Intellectual Property Ohfice; examiner's requisition for corresponding Canadian patent application No. 3,069,074, dated Jan. 11, 2023.

* cited by examiner

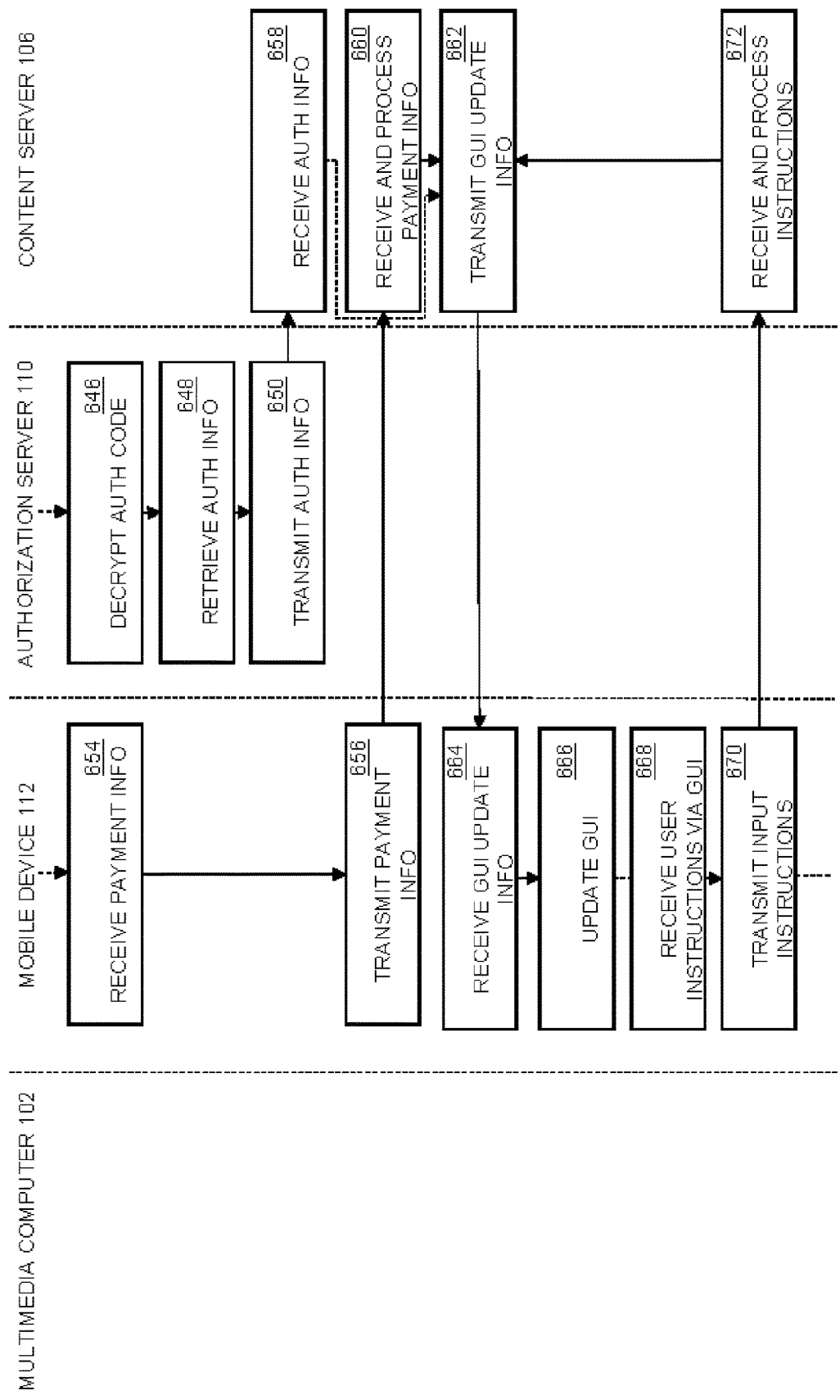

SYSTEMS AND METHODS FOR AUTHORIZING USER ACCESS TO RESTRICTED CONTENT

CROSS-REFERENCE TO RELATED APPLICATION

This application claims priority to UK patent application no. 1901296.2, filed Jan. 30, 2019, which is hereby incorporated by reference in its entirety.

FIELD

The present disclosure relates generally to authorizing user access to restricted content, and more particularly, to systems and methods for authorizing access to restricted content associated with a multimedia computer, such as a multimedia computer that is operable by multiple users.

BACKGROUND

Multimedia computers, such as entertainment systems, are sometimes provided with multimedia content, and may be configured for use by any party interacting therewith. The multimedia content provided by a multimedia computer may take the form of games and/or video playback services, and such entertainment systems may be available so that a user thereof can pass time during some other activity which does not require extensive input from the user. This may be, for example, during a journey on a vehicle such as a plane, train, taxi or the like where the user is merely a passenger. One example of a multimedia computer provided with multimedia content is an individual entertainment system provided for a passenger on an airplane. The individual entertainment system may allow a passenger interacting therewith to play games or watch videos whilst travelling.

Some games and/or videos may have age restrictions and require that a user be of a specific minimum age in order to access the content thereof, or at least specific aspects of the content thereof. Such content may be referred to as "restricted content". The age restrictions may be due to the nature of the storyline or effects of the content, either due to individual elements or as a whole. As an example, gambling-related games may have an age restriction set by law, which may be eighteen years of age. As a further example, videos in the form of movies or series may have age restrictions of thirteen, sixteen, eighteen, or the like. It may be desirable to have a user prove their age to a multimedia computer hosting restricted content before the user is able to access the restricted content, as failure to do so may lead to an underage person being exposed to inappropriate content. In some jurisdictions, allowing a user to access restricted content without having the user prove their age may be illegal.

Some multimedia computers may require a user to simply confirm with an input to the system that the user is of a certain age. However, this may not be sufficient to prevent an underage person from falsifying their age and accessing the restricted content.

Additionally, some multimedia computers may require a user to have an account with an operator thereof before the user is allowed to access restricted content offered by the multimedia computer. For some users, it may be undesirable to have such an account, particularly when the multimedia computer is operated by an entity with which the user does not expect to interact with often. Still, the user may need to create an account with such operator and provide them with verified information before the user is allowed to enjoy the full functionality of the multimedia computer.

SUMMARY

Viewed from one aspect, the disclosure provides a computer-implemented method. The method includes retrieving, by a mobile device from a multimedia computer, a network address at which a condition is defined, with the condition relating to authorizing access to restricted content associated with the multimedia computer. The method also includes retrieving, by the mobile device, details of the condition that is defined at the network address. Additionally, the method includes prompting, by the mobile device, a user of the mobile device for permission to provide to an authorization server authorization information that relates to the condition. Further, the method includes obtaining, by the mobile device, approval to provide the authorization information to the authorization server. Still further, the method includes transmitting, by the mobile device to the authorization server, the authorization information and a user profile identifier of the user. The user profile identifier is usable by the authorization server to retrieve from a database previously-stored user information for comparison with the authorization information so as to confirm a validity of the authorization information. Still further, the method includes, based on a confirmation of the validity of the authorization information, receiving, by the mobile device from the authorization server, an authorization code. Still further, the method includes, based on the receiving of the authorization code, providing, by the mobile device, a graphical user interface (GUI) that provides access to the restricted content associated with the multimedia computer.

Viewed from a second aspect, the disclosure provides a computer-implemented method that includes receiving, by a content server from a mobile device, an authorization code that is generated based on a user of the mobile device having been authorized to access restricted content, with the restricted content being associated with a multimedia computer. The method also includes transmitting, by the content server to an authorization server, the authorization code. Additionally, the method includes receiving, by the content server from the authorization server, authorization information provided by the mobile device and in relation to which the authorization code was generated by the authorization server. Further, the method includes transmitting, by the content server to the mobile device, GUI update information for updating a GUI provided by the mobile device. The GUI provides access to the restricted content associated with the multimedia computer.

Viewed from a third aspect, the disclosure provides a computer-implemented method that includes receiving, by an authorization server from a mobile device, authorization information and a user profile identifier of a user of the mobile device. The authorization information relates to a condition related to authorizing access to restricted content associated with a multimedia computer, and the user profile identifier is usable by the authorization server to retrieve from a database previously-stored user information. The method also includes retrieving, by the authorization server, the previously-stored user information from the database using the user profile identifier. Additionally, the method includes comparing, by the authorization server, the authorization information with the previously-stored user information so as to confirm a validity of the authorization information. Further, the method includes, based on a result of the comparing, generating, by the authorization server, an authorization code. Still further, the method includes transmitting, by the authorization server to the mobile device, the authorization code.

In a fourth aspect, an article of manufacture may include a non-transitory computer-readable medium, having stored thereon program instructions, that upon execution by a processor, cause a computing device to perform the operations of any of the first, second, or third aspects.

In a fifth aspect, a computing device may include a processor, a memory component, and program instructions, stored in the memory, that upon execution by the processor, cause the computing device to perform the operations of any of the first, second, or third aspects.

In a sixth aspect, a system may include means for carrying out the operations of any of the first, second, or third aspects.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 6C is a third portion of a swim-lane flow diagram, in accordance with example embodiments.

DETAILED DESCRIPTION

I. Introduction

Figure 1:
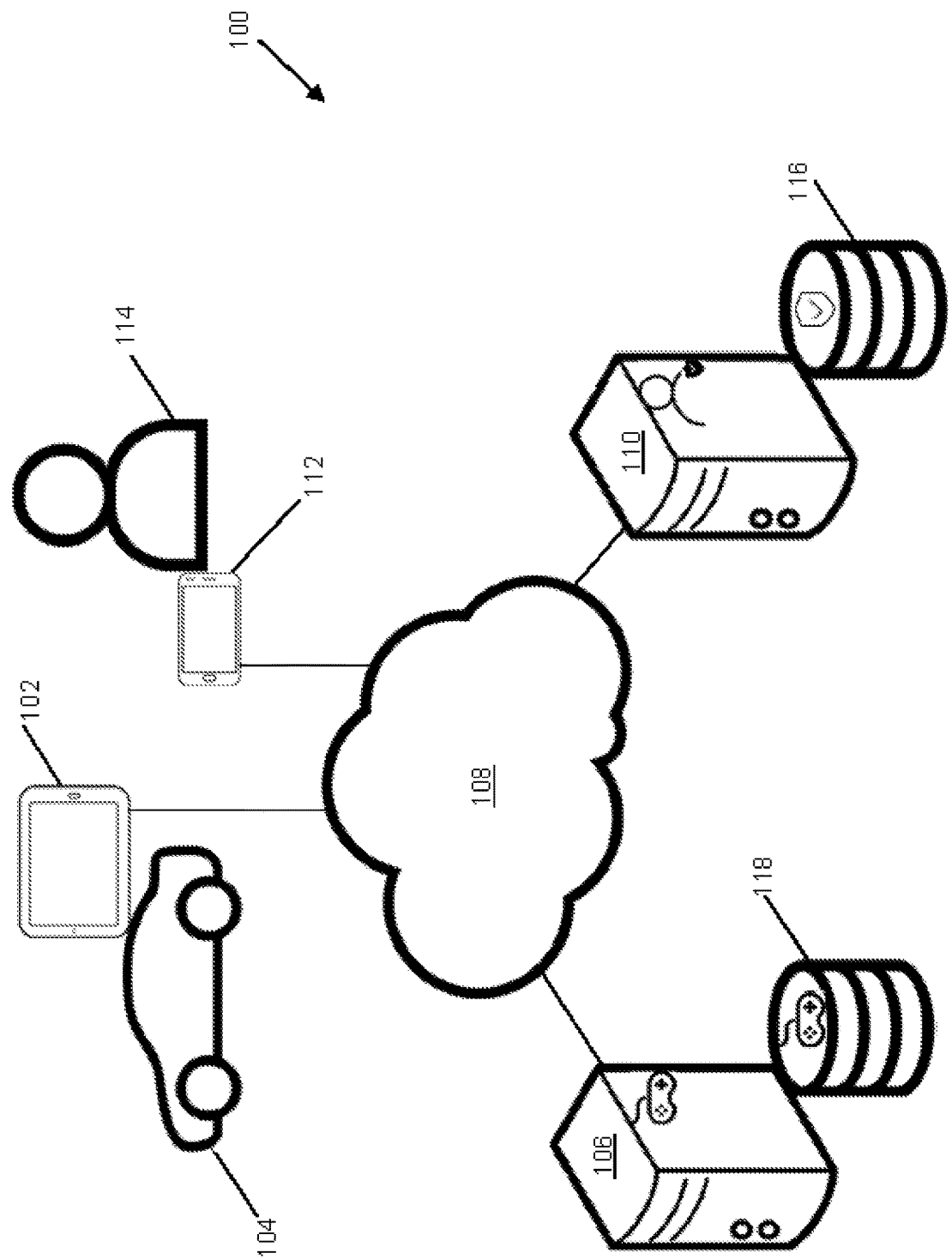
FIG. 1 is a schematic representation of a system for authorizing a user for access to restricted content, in accordance with example embodiments.

This description describes, among other things, several example embodiments including, but not limited to, embodiments pertaining to providing a user with access to restricted content that is associated with a multimedia computer, such as a multimedia computer that is operable by different users.

By way of example, a user may wish to interact with content that is associated with a multimedia computer provided in a taxi. To do so, however, the user may need to prove some of their credentials, such as their age, since there may be an age restriction associated with the content. Such content for which a user needs to prove that one or more of their credentials satisfy a condition may be referred to as "restricted content".

In an example embodiment, a content server may provide video content to a multimedia computer, which may in turn display it on a display that is visible to a user. For instance, a content server may broadcast a content stream to the multimedia computer.

The multimedia computer, in turn, may provide a network address at which a condition is defined. The condition may relate to authorizing access to restricted content associated with the mobile device. The network address may be provided at a location of the multimedia computer and may be retrievable using a mobile device. As one example, the network address may be encrypted and may be provided in the form of an optical code such as a quick response (QR) code, which the user can scan using their mobile device. As another example, the mobile device can capture the encrypted version from a radio frequency identification (RFID) tag, such as a near-field communication (NFC) tag. As another example, the network address may be provided in a readable text form which the user may manually copy into their mobile device.

After retrieving the network address, the mobile device may navigate to the network address, and retrieve details of the condition that is defined at the network address. The mobile device can then prompt the user for permission to provide authorization information that relates to the condition to an authorization server. For instance, the mobile device may have a copy of the authorization information stored on a memory element, and the mobile device could provide a prompt on a display of the mobile device. The prompt may include details of the requested information, as well as the identity of the party requesting the information.

After obtaining approval to provide the authorization information to the authorization server, the mobile device can transmit the authorization information to the authorization server, along with a user profile identifier of the user. The user profile identifier may be an identifier of a user profile that is stored at the authorization server and associated with the user. Prior to the authorization information being transmitted to the authorization server, a website located at the network address may check that the authorization information complies with the condition relates to authorizing access to the restricted content.

The authorization server can use the authorization information and the user profile identifier to confirm a validity of the authorization information. For example, the authorization server can consult a database to check the accuracy of the authorization information against previously-stored user information that is stored in relation to the user profile. If the authorization information is accurate and it is determined that the user may be authorized for access to restricted content, the authorization server can generate an authorization code and, optionally, encrypt the authorization code. The authorization server can then transmit the authorization code to the mobile device. In some instances, the mobile device may poll a network address for such a response from the authorization server.

As soon as the mobile device receives the authorization code, the mobile device can update a display of the mobile device to provide a user with a GUI which the user may use to interact with the video content. At this stage, a content session may be initiated. The GUI itself or a functionality of the GUI may be the restricted content for which the user has been authorized, since the GUI may provide functionality that may be age-restricted.

If an operator of the content server wants to know information about the user, the mobile device can transmit the authorization code to the content server. If relevant, the mobile device may also request payment information from the user, which the user may provide.

The content server may receive the authorization code from the mobile device, and may transmit the authorization code to the authorization server. It should be noted that the content server can be registered with the authorization server, and the content server and the authorization server may have a previously set-up encryption protocol for communication with each other.

The authorization server may receive the authorization code, and may then retrieve the authorization information that has been validated previously and in relation to which the authorization code was generated. The authorization server may then send the authorization information to the content server.

The content server may receive the authorization information from the content server, and may use the authorization information to transmit GUI update information to the mobile device. For example, the content server can use the authorization information to identify a name of the user, and transmit GUI update information to the mobile device such that the name of the user is inserted into the GUI. The mobile device may receive the GUI update information and update the GUI as appropriate.

In the meantime, the mobile device may transmit payment information received from the user to the content server, and the content server may receive and process the payment information. The content server may then again transmit appropriate GUI update information to the mobile device, which can receive the GUI update information and update the GUI accordingly.

When user input is received via the GUI on the mobile device, the mobile device can transmit instructions corresponding therewith to the content server, and the content server can receive and process such instructions. Processing the instructions may also result in the GUI being updated.

When a transaction termination instruction is received by the mobile device, the mobile device can transmit the transaction termination instruction to the content server. The content session on the mobile device may then be terminated. In addition, the content server may receive the termination instruction, and may process pay-out of a balance of the user's funds, if applicable.

Advantageously, the systems and methods disclosed herein can address the problem of authorizing a user for access to restricted content without the need for the user to have an account with or to be registered with a content provider. By allowing an authorization server to authorize a user, operators of entertainment systems can limit, or possibly eliminate, the risk of providing access to restricted content to a party which should not, in fact, be allowed such access. When the authorization server has authorized a user and the mobile device receives an authorization code from the authorization server, the user may be allowed to access the restricted content, which may involve interacting with the video content. As a result, the content server need not be provided with the user's authorization information in order for it to know that the user may access the restricted content. This may prevent unnecessary user information from being shared with content providers. Informing a user about what information will be shared, subject to their approval of such request, further allows a user to control the information sharing.

The authorization server may be operated by an identity provider, such as a "self-sovereign identity" provider. A self-sovereign identity provider may manage a user-created identifier and user profile on behalf of a user, and may only be allowed to access the user profile responsive to a user's explicit consent. Data relating to the user profile may be stored in a decentralized ledger or database, with the result that the user profile may not be deleted, but only updated after its creation. The information so stored may have been proven to be true previously. As a result, if the authorization information received from the mobile device is consistent with the data relating to the user profile, the authorization information can be trusted.

Further, with the systems and methods disclosed herein, video content can be streamed to the multimedia computer from the content server, thereby reducing the amount of storage capacity needed at the multimedia computer and the amount of data stored on individual multimedia computers. Additionally, in the event that the restricted content relates to gambling, where additional calculation may be required, the need for the multimedia computer to perform complex communications to determine the outcome of such a gambling game is similarly reduced. Where multiple multimedia computers are associated with the content server, the content server may perform calculations that would otherwise be required on such multiple multimedia computers. As a result, the systems and methods disclosed herein can be implemented more cost-effectively than if all multimedia computers stored all copies of data.

Still further, a user's mobile device can be used as a controller, and by utilizing the GUI displayed thereon, the user may interact with the content shown to the user on the display of the multimedia computer. This can eliminate the need to provide and maintain a respective remote control associated with each multimedia computer. As a result, the systems and methods disclosed herein can be implemented more cost-effectively.

To help illustrate features of the present disclosure, portions of this disclosure focus on QR codes by way of example. Those of ordinary skill in the art will readily appreciate, however, that the disclosed principles can be applied as well using other types of encrypted information, such as other types of barcodes or RFID tags, with variations where appropriate.

In this description the terms "user" and "customer" are used interchangeably depending on the context. For example, a user of an application on a mobile device can also be a customer of a merchant.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

II. Example Architecture

FIG. 1 depicts a schematic representation of an example system 100 for authorizing user access to restricted content, in accordance with example embodiments described herein. The system includes a multimedia computer 102 associated with a public transportation vehicle, presently a taxi 104. The multimedia computer 102 may take on any suitable form, and in the present example, the multimedia computer 102 is a tablet computer. The multimedia computer 102 is in data communication with a content server 106 over a communication network 108. The communication network 108 can include a wide-area network, such as the Internet. An authorization server 110 is also in data communication with the multimedia computer 102 over the communication network 108. Further, the authorization server 110 is in data communication with a mobile device 112 of a user 114 over the communication network 108.

The multimedia computer 102 can be located in other public transportation vehicles, such as trains and planes, or it may be provided at any location where access to a multimedia computer may be desired, such as a casino, a gymnasium, a shopping center, or the like.

The mobile device 112 can be any type of mobile device, such as a smartphone, tablet computer, or wearable computing device, and may be registered for use of the system 100. Further, the mobile device 112 can have an application installed thereon which facilitates operation of the system and methods associated therewith. The application may be configured to establish a secure communication channel with the authorization server 110 and/or the content server 106. The multimedia computer 102 may also have an application installed thereon which facilitates operation of the system and methods associated therewith, which application may also be configured to establish a secure communication channel with the content server 106.

The content server 106 may be any appropriate computing device performing the role of a server, such as a server computer, distributed server computer, cloud-based server computer, server computer cluster, or the like. Similarly, the authorization server 110 may be any appropriate computing device performing the role of a server, such as a server computer, distributed server computer, cloud-based server computer, server computer cluster, or the like. The content server 106 may incorporate multiple servers, collectively functioning as a single server for the purposes of the present disclosure.

The user 114 may have an account with the authorization server 110. The account may include various details of the user which may enable the user to be authorized. The account may also include other details which may be used in embodiments other than the present one. The authorization server 110 may be operated by a trusted entity which may allow users of the present systems and methods to trust authorizations made by the authorization server 110. In the present embodiment, the authorization server is a self-sovereign identity provider. Details associated with the user's account may be stored on a database 116 associated with the authorization server 110. The database 116 may be a decentralized and/or distributed ledger. Account details for users may be stored in an encrypted format, and the account details may only be decrypted when required to authorize a user.

While only one multimedia computer 102 is shown in the system 100 of FIG. 1, the system 100 may include a plurality of multimedia computers at various fixed locations or associated with various transportation vehicles. When multiple multimedia computers form part of the system, each such multimedia computer may have a unique identifier so that the content server 106 and authorization server 110 can determine which multimedia computer the user 114 intends to use to access the restricted content for which the user wishes to be authorized. Similarly, multiple users may each have an account with the authorization server 110 and may each make use of the system 100 using their own mobile device and a corresponding multimedia computer forming part of the system.

The mobile device 112 can be generally under the exclusive control of the user 114. As a result, the user account held by the authorization server in the database 116 may be uniquely associated with the mobile device 112. Each time the mobile device 112 is used to communicate with the authorization server 110, the authorization server 110 may rely on an assumption that the user 114 is operating the mobile device 112.

Figure 2:
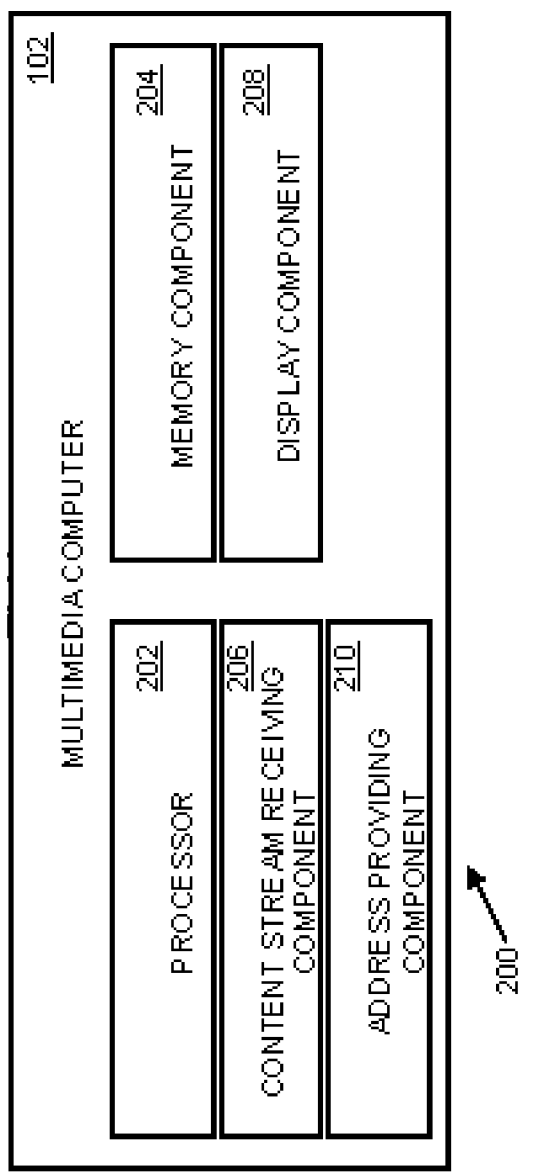
FIG. 2 is a simplified block diagram of an example multimedia computer, in accordance with example embodiments.

Next, FIG. 2 is a block diagram 200 depicting an example embodiment of the multimedia computer 102. In line with the discussion above, the multimedia computer 102 may be arranged to implement any of the methods for authorizing a user for access to restricted content as described herein. As shown in FIG. 2, the multimedia computer 102 may include a processor 202 arranged to execute the functions of various components, which may be provided by hardware or by software units executing on the application server 102. The software units may be stored in a memory component 204, and instructions may be provided to the processor 202 to carry out the functionality of the described components. The various components can include a content stream receiving component 206, a display component 208, and an address providing component 210.

The content stream receiving component 206 may be arranged to receive video content provided by a content server, such as the content server 106 of FIG. 1. For instance, the content stream receiving component 206 may be arranged to receive a content stream broadcast by a content server.

The display component 208 may be arranged to display the video content received by the content stream receiving component 206 on a display associated with the multimedia computer and at a location where a user may view the display.

The address providing component 210 may be arranged to provide a network address for retrieval by a user's mobile device, such as the mobile device 112 of FIG. 1. At this network address, a condition relating to authorizing a user for access to restricted content may be defined. Additionally, a GUI that allows interaction with content hosted by the content server 106 may be provided at the network address.

Figure 3:
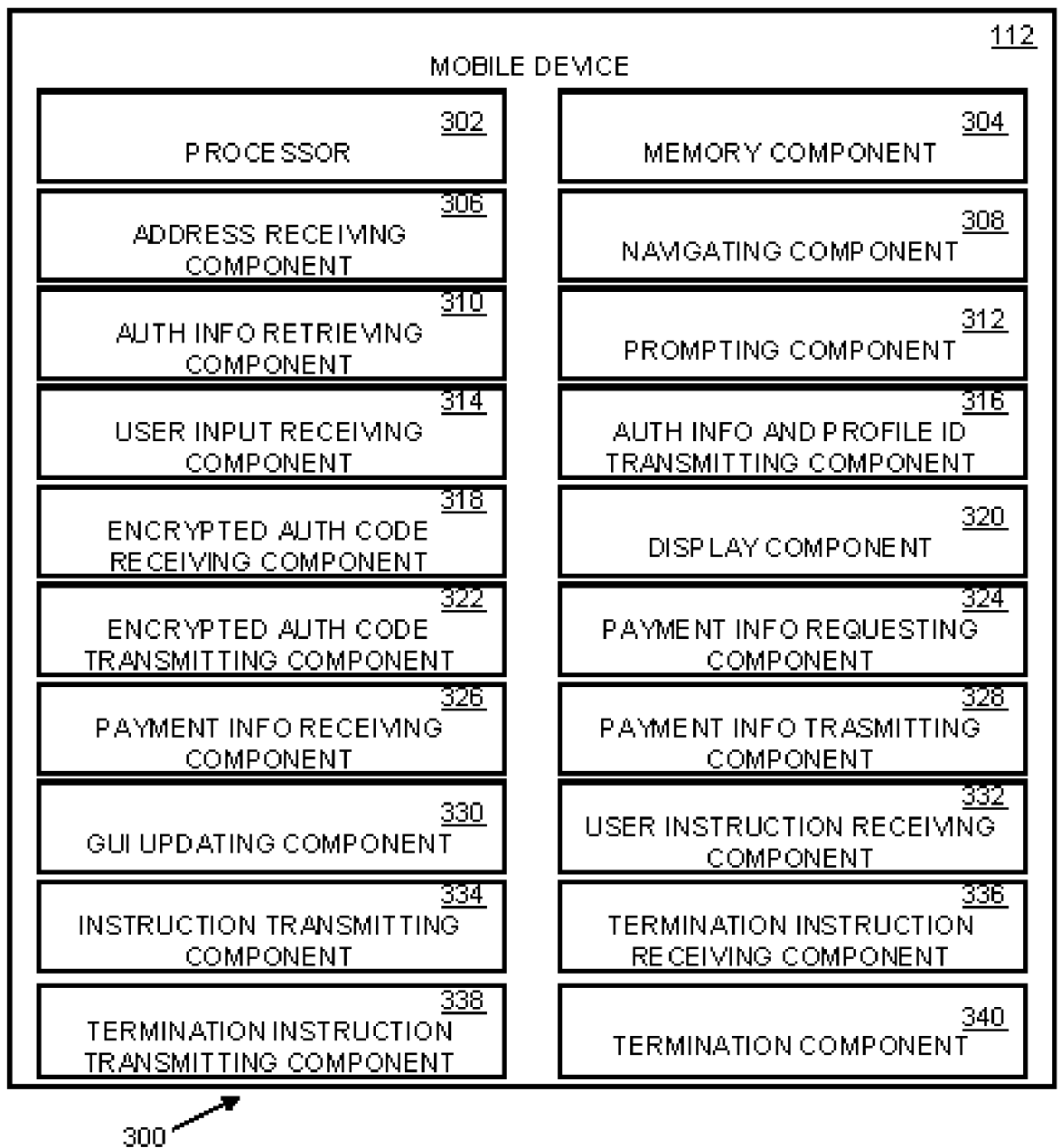
FIG. 3 is a simplified block diagram of an example mobile device, in accordance with example embodiments.

Next, FIG. 3 is a block diagram 300 depicting an example embodiment of the mobile device 112 of FIG. 1. In line with the discussions above, the mobile device 112 may be arranged to implement any of the methods for authorizing a user for access to restricted content described herein. As shown in FIG. 3, the mobile device 112 may include a processor 302 arranged to execute the functions of various components, which may be provided by hardware or by software units executing on the mobile device 112. The software units may be stored in a memory component 304, and instructions may be provided to the processor 302 to carry out the functionality of the described components. The various components can include an address receiving component 306, a navigating component 308, an authorization information retrieving component 310, a prompting component 312, a user input receiving component 314, an authorization information and profile identifier transmitting component 316, an encrypted authorization code receiving component 318, a display component 320, an encrypted authorization code transmitting component 322, a payment information requesting component 324, a GUI information receiving component 326, a payment information transmitting component 328, a GUI updating component 330, a user instruction receiving component 332, an instruction transmitting component 334, a termination instruction receiving component 336, a termination instruction transmitting component 338, and a termination component 340.

The address receiving component 306 may be arranged to receive a network address from a multimedia computer, such as the multimedia computer 102 of FIG. 1. The network address may be received in an encrypted format, for example, in a QR code received by way of an appropriate scanner on the mobile device 112, such as a camera. The mobile device 112 may then extract the network address from the QR code, and may then navigate thereto via the navigating component 308. Navigation may occur in a standard internet browser or via an application specifically configured for use with the present methods and systems.

The authorization information retrieving component 310 may be arranged to retrieve details of a condition that is defined at the network address. The details of the condition can include information that is required to authorize user access to restricted content. The prompting component 312 may then prompt a user, such as the user 114 of FIG. 1, for permission to provide authorization information that relates to the condition to an authorization server, such as the authorization server 110 of FIG. 1, for checking. The prompting component 312 can provide a prompt including details of the required authorization information, as well as details of the entity requesting such information. In the present embodiment, the entity may be the content provider that is operating the content server 106.

The user input receiving component 314 may then receive user input indicating an approval response or denial response to the prompt. If approval is provided, the authorization information and profile identification transmitting component 316 may transmit the authorization information and a user profile identifier from the mobile device 112 to the authorization server 110. It should be noted that a copy of the authorization information may be stored on the mobile device 112, and the copy can be provided to the authorization server 110 so that the accuracy thereof can be confirmed. Examples of authorization information may include an age of a user (either explicitly or implicitly via, for example, a birth date of the user), a mobile number or email address of the user, an identity number of the user, a user's membership with a specific program or club, or the like. The authorization information may be chosen specifically for a type of restricted content to be accessed. For example, access to restricted content with an age restriction may require a user's age to be confirmed. The authorization information transmitted to the authorization server 110 may be referred to as an "attestation", as the accuracy of the information is attested to by the user 114.

The encrypted authorization code receiving component 318 may be arranged to receive an encrypted authorization code form the authorization server 110. This encrypted authorization code may be in the form of a JavaScript Object Notation (JSON) Web Token (JWT). The JWT may only be transmitted to the mobile device 112 if the authorization information, or attestations, the mobile device has provided to the authorization server 110 has been proven to be accurate. It should be noted that the mobile device 112 need not be able to decrypt the authorization code, as will be further described below.

The display component 320 may be arranged to display a GUI to the user, which the user may use to interact with the content shown on the multimedia computer. The GUI may be displayed on a display associated with the mobile device 112, and the user input receiving component 314 may be arranged to receive user input via the GUI. In some examples, the display associated with the mobile device may be a touch-sensitive display. If, for example, the content is a video feed on which a wager may be placed, the GUI may allow the user to select when and what size or type of wager to place.

In some examples, the authorization server may send the authorization code to the mobile device after determining that the authorization information is accurate. Further, the GUI may be displayed immediately upon receipt of the encrypted authorization code. The mobile device 112 may continuously poll the authorization server 110 for the authorization code, and possibly at a specific website address. The display of the mobile device, possibly pointing to the website previously navigated to, may update to show the GUI as soon as the authorization code is received.

The encrypted authorization code transmitting component 322 may transmit the authorization code in its encrypted format to a content server, such as the content server 106 of FIG. 1. In the event that the content server comprises multiple servers, the encrypted authorization code may be transmitted to a server associated with the content server, but for the purposes of the present description it is only referred to as a single server.

A user may wish to use funds to interact with the restricted content. For example, the restricted content may be wager-related content, and a user may wish to place a bet or wager on a specific event. Accordingly, the payment information requesting component 328 may request the user 114 to provide payment information, for example credit card details. The user may provide the payment information to the mobile device in any suitable manner, and the payment information receiving component 326 may receive such information. The payment information transmitting component 328 may transmit the payment information to the content server.

The GUI updating component 330 may be arranged to update the GUI in response to receiving GUI update information. GUI updating information may be received from the content server 106 in response to interaction instructions provided by a user, a result of a bet or wager that the user has placed, authorization information received by the content server, or the like.

The user instruction receiving component 332 may receive user instructions provided via the GUI. This may be, for example, what wager to place on the content shown on the display associated with the multimedia computer 102. The instruction transmitting component 334 may transmit such user instructions to the content server 106.

The termination instruction receiving component 336 may receive a termination instruction. For example, the termination instruction receiving component 336 may receive a termination instruction from the user when the user wishes to terminate participation with the restricted content. In such a case, the termination instruction transmitting component 338 may transmit a termination instruction to the content server 106 to terminate the user's participation. The termination component 340 may terminate a user's participation and may cause the display of the GUI to end.

Figure 4:
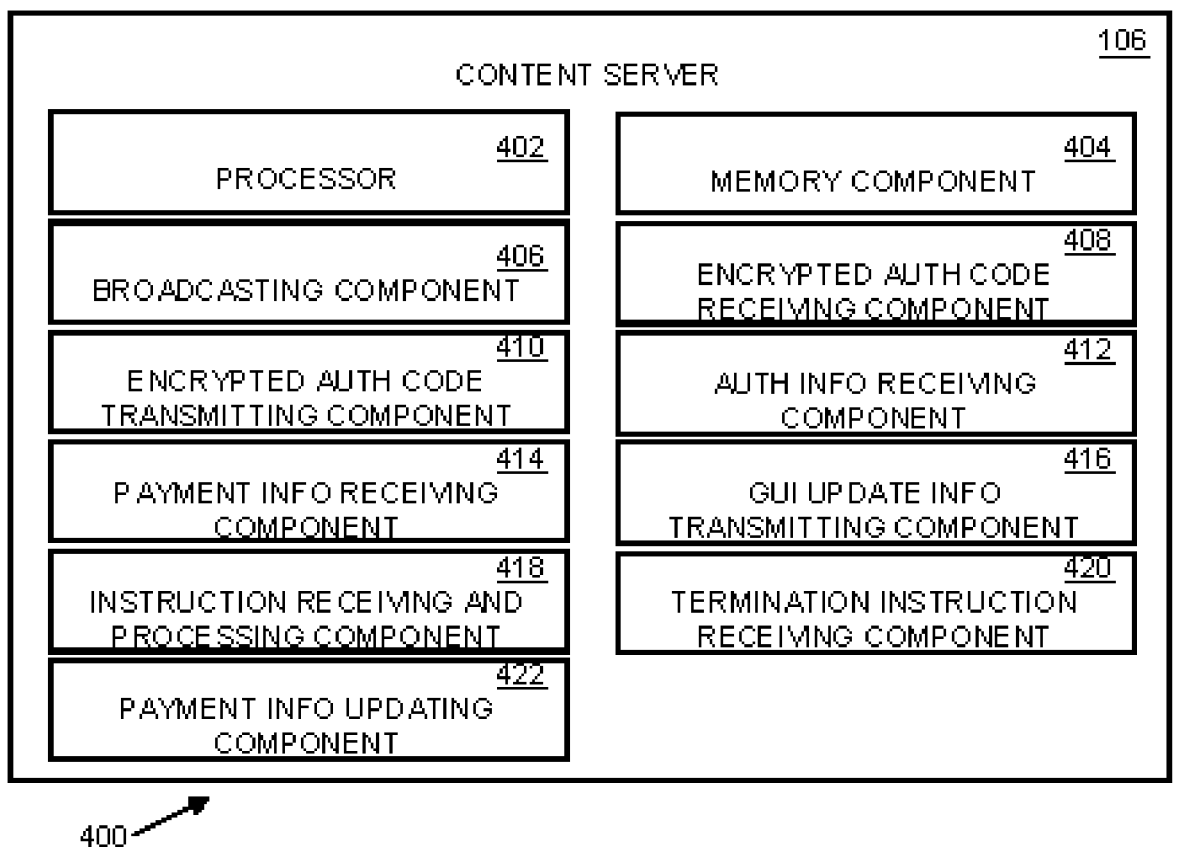
FIG. 4 is a simplified block diagram of an example content server, in accordance with example embodiments.

Next, FIG. 4 is a block diagram 400 depicting an example embodiment of the content server 106. In line with the discussion above, the content server 106 may be arranged to implement any of the methods for authorizing user access to restricted content described herein. As shown in FIG. 4, the content server 106 may include a processor 402 arranged to execute the functions of various components, which may be provided by hardware or by software units executing on the content server 106. The software units may be stored in a memory component 404, and instructions may be provided to the processor 402 to carry out the functionality of the described components. The various components can include a broadcasting component 406, an encrypted authorization code receiving component 408, an encrypted authorization code transmitting component 410, an authorization information receiving component 412, a payment information receiving component 414, a GUI updating information transmitting component 416, an instruction receiving and processing component 418, a termination instruction receiving component 420, and a payment information updating component 422.

The broadcasting component 406 may be arranged to provide video content to a multimedia computer, such as the multimedia computer 102 of FIG. 1. For example, the broadcasting component 406 may be arranged to broadcast a content stream to the multimedia computer.

The encrypted authorization code receiving component 408 may be arranged to receive an encrypted authorization code from a mobile device, such as the mobile device 112 of FIG. 1. The code may be received in a JWT format, such as in the same format as originally received by the mobile device 112. The encrypted authorization code transmitting component 410 may be arranged to transmit the encrypted authorization code to an authorization server, such as the authorization server 110 of FIG. 1. The content server 106 may have an account with and/or be registered with the authorization server, and the authorization server and content server 106 may have a pre-agreed encryption protocol allowing for mutual encryption of communication.

The authorization information receiving component 412 may be arranged to receive authorization information associated with the authorization code from the authorization server. The authorization information may be received in a format that is readable or decryptable by the content server 106.

The payment information receiving component 414 may be arranged to receive payment information from the mobile device. The GUI update information transmitting component 416 may be arranged to transmit, to the mobile device, information required to update the GUI shown to the user on a display of the mobile device. Such information to update the GUI may be transmitted responsive to payment information being received from the mobile device, instructions being received from the mobile device, or authorization information being received form the authorization server 110.

The instruction receiving and processing component 418 may be arranged to receive instructions from the mobile device. Such instructions may be received responsive to instructions being provided by a user by way of the GUI provided by the mobile device. The instruction receiving and processing component 418 may be further arranged to process such instructions.

The terminating instruction receiving component 420 may be arranged to receive a termination instruction from the mobile device, and the payment information updating component 422 may be arranged to, upon terminating the user's access, update the user's payment information by, for example, paying out winnings or a remainder of a balance of the user for the session.

Figure 5:
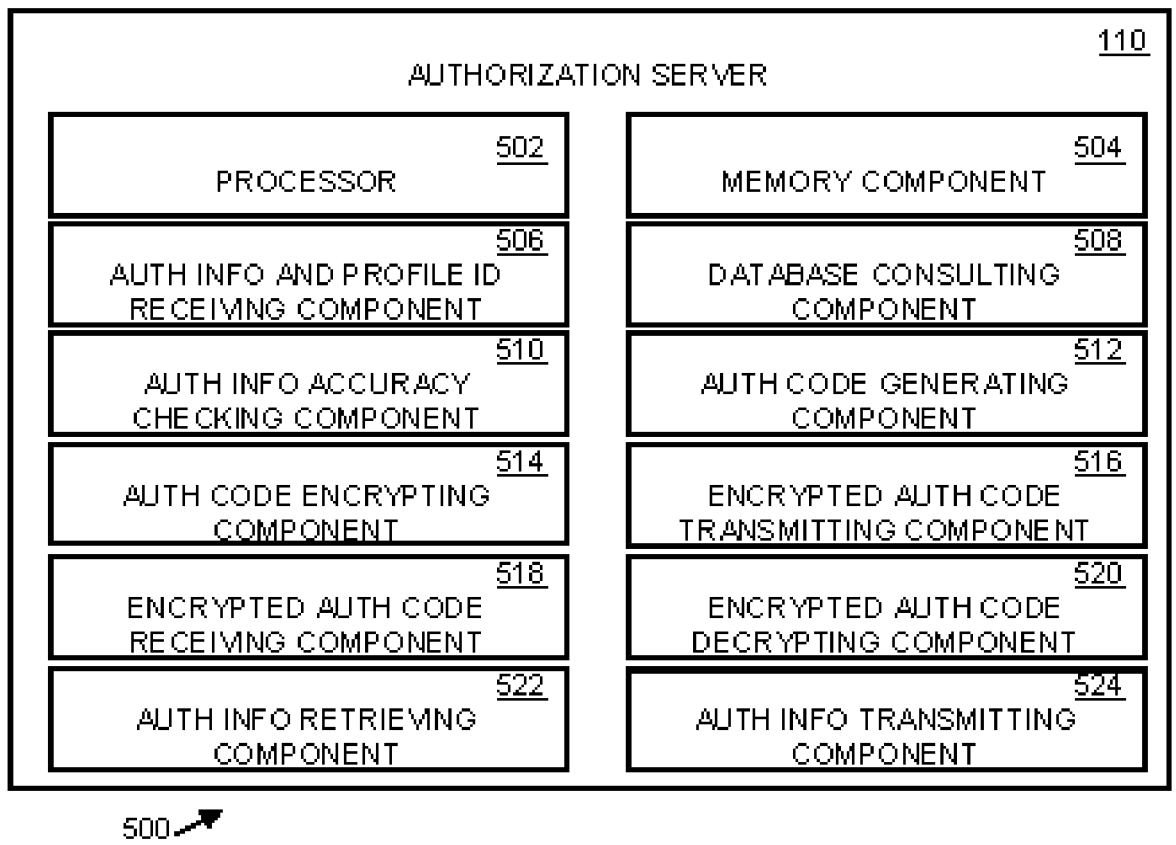
FIG. 5 is a simplified block diagram of an example authorization server, in accordance with example embodiments.

Next, FIG. 5 is a block diagram 500 depicting an example embodiment of the authorization server 110 of FIG. 1. In line with the discussion above, the authorization server 110 may be arranged to implement any of the methods for authorizing user access to restricted content described herein. As shown in FIG. 5, the authorization server 110 may include a processor 502 arranged to execute the functions of various components, which may be provided by hardware or by software units executing on the authorization server 110. The software units may be stored in a memory component 504, and instructions may be provided to the processor 502 to carry out the functionality of the described components. The various components can include an authorization information and profile identifier receiving component 506, a database consulting component 508, an authorization information accuracy checking component 510, an authorization code generating component 512, an authorization code encrypting component 514, an encrypted authorization code transmitting component 516, an encrypted authorization code receiving component 518, an encrypted authorization code decrypting component 520, an authorization information receiving component 522, and an authorization information transmitting component 524.

The authorization information and profile identifier receiving component 506 may be arranged to receive, from a mobile device such as the mobile device of FIG. 1, authorization information, or attestations, and a profile identifier that is usable to identify the user's profile on a database of the authorization server, such as the database 116 of the authorization server 110. The database consulting component 508 may be arranged to consult the database to retrieve information associated with the user profile corresponding to the user profile identifier, and the authorization information accuracy checking component may be arranged to check the accuracy of the authorization information that the user has provided against the information retrieved from the database. If the authorization information is confirmed to be accurate, the authorization code generating component 512 may be arranged to generate an authorization code.

The authorization code encrypting component 514 may be arranged to encrypt the authorization code in a manner such that only the authorization server 110 may decrypt it, possibly as part of a JWT. The encrypted authorization code transmitting component 516 may be arranged to transmit the encrypted authorization code to the mobile device 112. It should be noted that the encrypted authorization code, as well as the authorization information leading to the creation of the encrypted authorization code, may be cached in a memory component of the authorization server for ease of access at an expected later stage.

The encrypted authorization code receiving component 518 may be arranged to receive the encrypted authorization code from a content server, such as the content server of FIG. 1. The encrypted authorization code decrypting component 520 may be arranged to decrypt the authorization code. The authorization information retrieving component 522 may be arranged to retrieve the authorization information from the cache of the authorization server, where it may be stored in association with the specific authorization code. The authorization information transmitting component 524 may be arranged to transmit the authorization information to the content server in a format that is viewable by the content server.

III. Example Operations

In line with the discussion above, the system 100 can be used to authorize user access to restricted content, such as elements of an electronic gambling game. FIGS. 6A to 6D form a swim-lane flow diagram 600 that illustrate such an example method for authorizing user access to restricted content. The example method may be performed by the multimedia computer 102, the content server 106, the authorization server 110, and the mobile device 112. Operations of the method performed on the multimedia computer 102 and mobile device 112 may be performed by applications installed thereon. Respective swim-lanes indicate respective operations, functions, steps, decisions or processes that can be performed by the respective devices. The operations are shown within blocks 602 through 682. A description of those blocks now follows.

In the example method, the multimedia computer 102 is located within, and associated with, a public transportation vehicle in the form of a taxi 104. While the example of a taxi is used, it should be noted that the multimedia computer 102 may be located in any suitable location, whether in a public transportation vehicle or at a fixed, physical location. An airplane, a train, and a ferry are examples of other public transportation vehicles, while a casino or pub is an example of a fixed physical location where such a multimedia computer 102 may be provided.

Referring to FIG. 1 and FIGS. 6A to 6D, the example method can, for example, be carried out after the user 114 boards the taxi 104 as a passenger. The multimedia computer 102 may be provided in the taxi, in a convenient location. It may be expected that the user has their mobile device with them when boarding the taxi. The user may even have hailed the taxi by an appropriate ride-sharing application installed on the user's mobile device. It should be noted that the taxi may take the form of a vehicle used in a ride-sharing service, such as Uber®.

At block 602, the content server 106 can broadcast a content stream to the multimedia computer 102, and, at block 604, the multimedia computer 102 can receive the content stream. The content stream need not be altered based on user interaction therewith and, at block 606, the multimedia computer 102 can display the content stream on a display provided at and associated with the multimedia computer 102. The content stream may include details as to how a user 114 may be authorized to access restricted content and interact with the content stream. In the present embodiment, the content stream includes a QR code which contains a network address. The content server can thereby, at block 608, provide a network address to the mobile device 112 where a condition related to authorizing the user for access to restricted content is defined.

The user 114 can use their mobile device 112 to scan the QR code, and can receive the network address at block 610. At block 612, the mobile device 112 can navigate to the network address, which may be an internet website. The internet website may be displayed to a user in an internet browser application operating on the mobile device. At the network address, and at block 614, the mobile device can retrieve specifics of the defined condition that relates to authorizing the user 114 for access to the restricted content. In the present example embodiment, the condition includes a minimum-age requirement, as well as the provision of an email address and telephone number. A user may be provided with a selectable "login" option, and may select this to advance the method. At this stage, the mobile device may automatically open an application operating on the mobile device which may be required to allow progress of the present systems and method. The application may be associated with the authorization server 110.

At block 616, the user can be prompted for access to authorization information related to the condition. The user's mobile device may have, stored in a memory component thereof, copies of various information that may be requested, such as copies of various credentials. A copy of the information related to the condition is also associated with a profile of the user at the authorization server 110. The application operating on the mobile device 114 may secure this information and may be utilized to access the information. Details of the condition (e.g., criteria required to be met to authorize a user for access to restricted content) may be specified and defined at the network address, and a user may not be able to access the restricted content if these criteria are not met by information the mobile device provides. One example of a condition is a minimum-age restriction—the age of a user according to the information stored on their mobile device may need to meet or exceed the required minimum age before the mobile device allows the method to proceed. Details of the entity requesting the information, presently the content server, may also be provided.

Should the user wish to provide the required information from their mobile device, and transmit it to the authorization server for checking, the user may approve the prompt at block 618. At block 620, the mobile device then transmits the authorization information as well as a user profile identifier to the authorization server 110. The authorization information the user provides may be referred to as attestations, as the user attests to the accuracy of the information. Should the user not provide such approval, the method may terminate in an appropriate manner. When the authorization information has been sent to the authorization server 110, the application may close and the user may again be shown an internet browser window. The user profile may be any suitable identifier of the user, whether a unique name or number, or even a unique identifier of the mobile device, such as an international mobile equipment identity (IMEI) number thereof. Assuming there is a unique relationship between the user and their mobile device, an identifier of the mobile device may serve to identify the user and, therefore, the user profile.

The authorization server 110 receives the authorization information and user profile identifier at block 622.

Figure 6A:
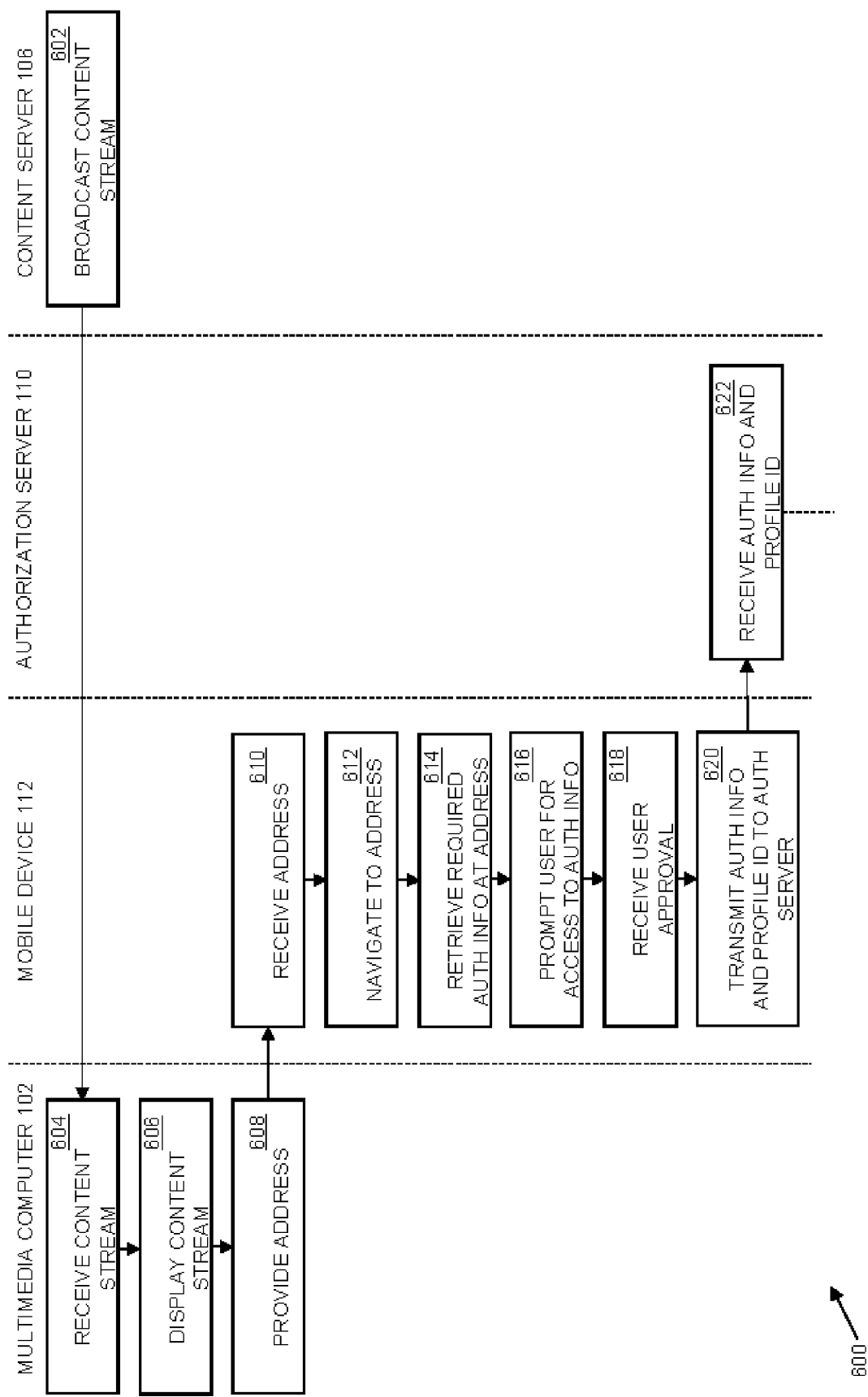
FIG. 6A is a first portion of a swim-lane flow diagram, in accordance with example embodiments.
Figure 6B:
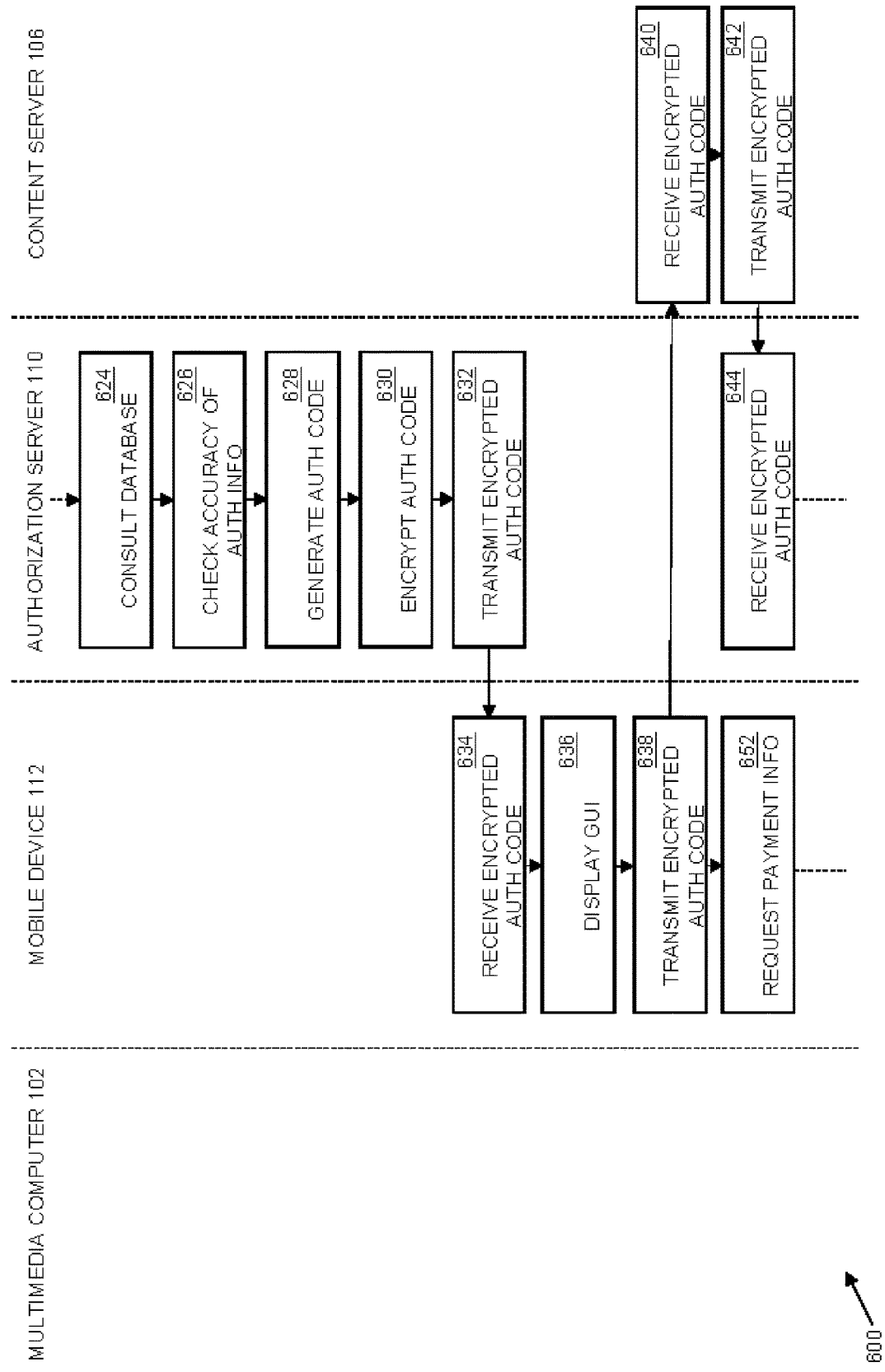
FIG. 6B is a second portion of the swim-lane flow diagram, in accordance with example embodiments.

Moving to FIGS. 6B and 6C, the authorization server 110 consults the database 116 at block 624, to retrieve the information associated with the user profile corresponding to the profile identifier received from the mobile device 102. At block 626, the authorization server 110 checks the accuracy of the authorization information by comparing the authorization information to the information associated with the user profile. The authorization server can be managed by a trusted entity, such as a self-sovereign identity provider. Accordingly, the accuracy of all user information stored by the authorization server may have been previously confirmed and, as a result, the validity thereof can be trusted. Confirmation may have been by the provision of a suitable document, such as a driving license, passport or identity document.

If the accuracy of the authorization information is proven, i.e. the attestations are correct and the user should be authorized for access to the restricted content, the authorization server 110 generates an authorization code at block 628. The authorization code can be expected to be unique for the present authorization. At block 630, the authorization code is encrypted. In some examples, the authorization code can be encrypted in a manner that only the authorization server can decrypt. At block 632, the authorization code is transmitted to the mobile device 112.

At block 634, the mobile device receives the encrypted authorization code. The mobile device 112 may poll a polling network address for a response which includes such encrypted authorization code, the polling network address being where the encrypted authorization code is received. As soon as the encrypted authorization code is received, the mobile device can be sure that the authorization information that the user has provided has been proven to be accurate, and the mobile device may be allowed access to the restricted content.

In the present embodiment, the restricted content is a GUI or a functionality of the GUI that allows a user to interact with content shown on the display of the multimedia computer. The GUI can allow a user to place bets or wagers on the content shown, with the user then being able to win money as a result of the bets or wagers. The content stream of the present embodiment may include a video or simulation of a gambling event on which a bet may be placed, such as a simulation of a table game (e.g., roulette). Similarly, a live sports event may form part of the content stream, with a functionality of the GUI then functioning as restricted content which the user may use to bet on the sports event. When the encrypted authorization code is received, in the present embodiment at the polling network address, the mobile device may update the display of the mobile device. The web browser may now display the GUI to the user at block 636. When the GUI is displayed to the user, it may be considered that a content session, presently a gaming session, has been initiated.

At this stage, the user has been authorized for access to the restricted content. The content server may trust that this has been done in an appropriate manner as the self-sovereign identity provider is a trusted entity and its authorization principles may be trusted. As a result, an operator of the content server need not know the authorization information themselves to be sure that the user has been appropriately authorized. Authorization of the user is then completed, and some elements of the method discussed further below may not be necessary, but may be incorporated in specific instances. Such instances may be when the operator of the content server requests or is legally required to obtain some of the authorization information of the user. Similarly, payment information of the user may be required to enable full functionality of interaction with the content stream, as further detailed below.

To allow the content server to obtain some of the authorization information, the method may proceed further. At block 638, the encrypted authorization code is transmitted to the content server 106. At block 640, the content server 106 receives the encrypted authorization code, and at block 642, the content server 106 transmits the encrypted authorization code to the authorization server 110.

The authorization server 110 receives the encrypted authorization code at block 644, decrypts the authorization code at block 646, and then retrieves the authorization information previously cached and associated with the authorization code at block 648.

At block 650, the authorization server 110 transmits the authorization information to the content server 106 in a format in which the content server can read. At block 658, the content server 106 receives the authorization information.

In the present embodiment, after the mobile device 112 has transmitted the encrypted authorization code to the content server 106 at block 638, the mobile device 112 requests payment information from the user at block 652. As the restricted content is a functionality of the GUI that allows gambling, some monetary value may be required in order to participate and make a bet or wager. The payment information of the present embodiment is credit card information, which may be used to pay for credits that may be used in making a bet or wager.

At block 654 the payment information is received from the user. The payment information may have been input by the user via the GUI. At block 656, the mobile device 112 transmits the payment information to the content server 106 for appropriate processing to allow credits to be loaded for further play of the gambling game. At block 660, the content server 106 receives the payment information.

At block 662, the content server may transmit GUI updating instructions to the mobile device 112. This may be as a result of either receiving the payment information at 660, or after receiving authorization information in block 658 above. As an example, the authorization information may allow a user's name to be displayed on the GUI, while the user's payment information may be used to show the amount of payment credits loaded to their account for play.

At block 664, the mobile device 112 receives the GUI updating information, and at block 666, the GUI is updated.

If a user wishes to use the GUI to play the game, at block 668, user input may be received by the mobile device 112 via the GUI. The mobile device 112 may transmit instructions corresponding to the user input to the content server 106 at block 670. The content server 106 can receive and process such instructions at block 672. The instructions may be, for example, placing a bet on a potential outcome of the content feed, presently a roulette game.

Then, responsive to the placing of or a result of the player's bet or wager, the content server may transmit GUI updating instructions to the mobile device, similar to how it was done as in block 662 above. The mobile device may then continue to update the GUI as before. The GUI may be updated to display a user's winnings, to display a celebration in response to a win, to display a user's updated funds available to the user after a win or loss, or the like.

Figure 6D:
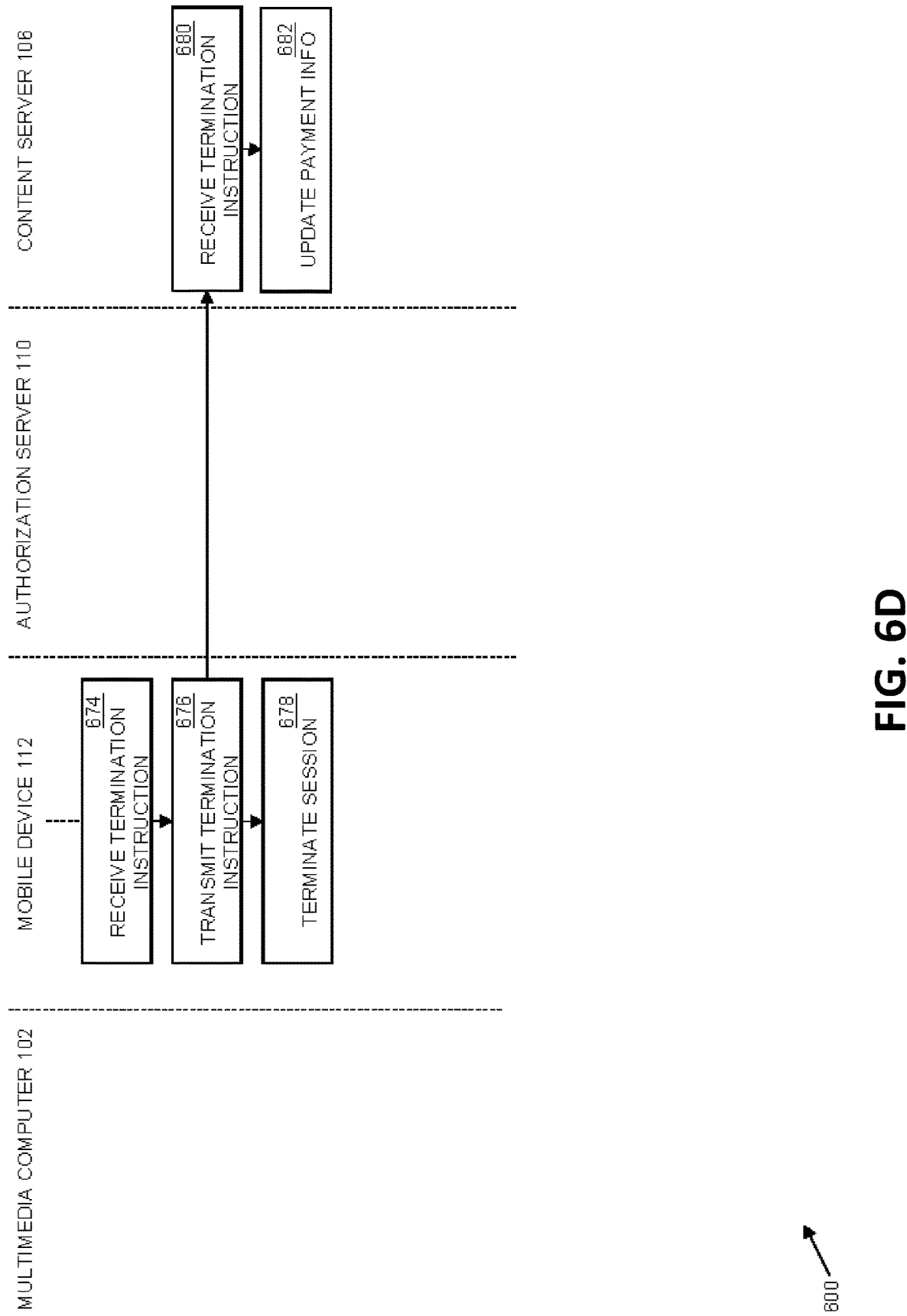
FIG. 6D is a fourth portion of the swim-lane flow diagram, in accordance with example embodiments.

Moving to FIG. 6D, at a later stage, when the user wishes to terminate their gaming session, the user may instruct the mobile device to that effect. The user may provide such instruction via the GUI, and the mobile device 112 may receive the instruction at block 674. At block 676, the mobile device 112 may transmit a termination instruction to the content server and, at block 678 the mobile device 112 may terminate the user's access to the restricted content. The present gaming session has then been terminated.

The content server 106 may receive the termination instruction at block 680 and, at block 682, the content server may update a user's payment information by, for example, repaying the remainder of the user's account, possibly including any winnings the user may have collected during their gaming session. The payment may be made to the same account from which the monies were received, such as a credit card account. However, winnings could also be stored at the content server for use at a later stage, should the user allow this. Then, the content server may require the user to create an account. The account may be created using at least some of the authorization information provided by the content server. Alternatively, payment may instead be made to a different account, which may be specified by the user.

In some examples, the authorization server may check the attestations or authorization information with minimum requirements without consulting previously-stored information for the user. In such an embodiment, the authorization information transmitted form the mobile device to the authorization server may include the necessary requirements to be confirmed, for example a minimum age to be confirmed. Then, the authorization code may only be generated if such requirements are met.

In the above example embodiment, the display of the multimedia computer is essentially a passive device, in that it simply displays the content stream the multimedia computer receives. The content the multimedia computer receives may be a broadcast content stream, and multiple different multimedia computers may receive this exact same broadcast. However, it is envisaged that the multimedia computer may instead be an active device, with the content stream being updated by the content server responsive to user input. As an example, the multimedia computer may be adapted to provide the content server with authorization information, betting information, wallet information or the like of the user, instead of all such information being shown on the user's mobile device. In such an embodiment, the content stream may be transmitted to the relevant multimedia computer instead of broadcast to multiple multimedia computers. Similarly, the content stream may require specific user instructions to proceed. This may be, for example, where the content stream shows an electronic slot machine, and a user is required to instruct a spinning action for reels of the slot machine to spin. In such embodiments, the content server may identify the multimedia computer and link the multimedia computer to its connection with the mobile device so that the content server can update the content stream as appropriate. The multimedia computer may have a unique network address, and the content server may be provided with the network address at which the GUI is being accessed so that it knows which content stream to update for the specific session of the user. However, other ways of identifying the multimedia computer to the content server may also be employed. For example any unique identifier associated with the content server and transmitted to the content server via the mobile device can be used. In such embodiments, the content stream may incorporate some restricted content for which the user needs to be authorized to view.

Another example of restricted content may be videos, such as movies or episodes of series, which are associated with a video streaming service with which the user has an account and is a member, such that the videos are available to the user. Then, the user profile stored at the authorization server may be associated with the user's account details, and the user may only be provided with access to the content if the user's membership to such streaming service has been confirmed. In such an embodiment, the authorization information can include a user's membership details (e.g., an account number or the like). Also, the user's mobile device may provide a GUI that functions as a remote control for the content stream, with the user able to play, pause, skip forwards or backwards, select a video to view, or the like. In such an embodiment, the multimedia computer and mobile device may be linked by the content server to enable such functionality.

In some embodiments, a user may not be signed up for use of the systems and methods described herein when they are provided with the opportunity to access a multimedia computer configured for use of the present systems and methods. Appropriate directions may then be provided to such a user to sign up for use of the systems and methods. This may include downloading an appropriate application to facilitate the methods and systems described above. This may be initiated as a result of attempting to receive the network address from the multimedia computer, such as by scanning the QR code as discussed above.

Alternative embodiments may not require a user's mobile device to store a copy of information to be authorized—rather, only a user profile identifier along with details of the information to be authorized could be transmitted to the authorization server. The authorization server may then confirm that the authorization information meets the specified criteria, and may then transmit an encrypted authorization code to the mobile device, similar to the embodiment described above.

It is envisaged that payment need not be made by credit card, as per the above example. A user may provide other payment card details, or may have an electronic wallet located on their mobile device, or may have an electronic wallet associated with their account at the authorization server. Any of these payment details may then be used to provide the funds required to fully access and interact with the restricted content. Multiple different currencies, and even cryptocurrencies, may form part of a user's electronic wallet, and the user may be allowed to select which of these they wish to use. Similarly, a user may be allowed to select which currency they would like to receive pay-outs in if, for example, they have won monies in an electronic gambling game.

A user's mobile device may be uniquely associated with an account of a user, and it will be apparent that the loss or replacement of a user's mobile device may cause the disassociation of the account with that device. This may prevent unwanted use of the user's account and information by a person in possession of the user's old, stolen or lost mobile device. It may be expected of a user to inform the authorization server if their mobile device has been stolen or lost so that future authorization requests attempted with that mobile device may be blocked.

In the example method described with reference to FIGS. 6A-6D, the network address is captured by the mobile device from a QR code displayed on the multimedia computer, with an application operating on the mobile device being adapted to decrypt the QR code to extract the network address. However, many other technologies may be used to provide the network address to a user's mobile device. As an example, an RFID tag or NFC tag may be provided, and the user's mobile device may include an appropriate RFID or NFC scanner or reader to scan such a tag. The application may again be configured to extract the network address from the scanned tag, and the method may operate further in the same manner as described above with reference to the figures. The network address may also be provided in plain text format, which the user may the scan using an optical character recognition application on the mobile device, or the user may simply manually copy the plain text into their mobile device.

It is envisaged that use of the present systems and method may be linked to a specific trip which the user is taking at the same time. For example, if the taxi forms part of a ride-sharing platform, such as Uber®, the specific history of the Uber application on the user's phone may include details of the restricted content viewed by the user, as well as their interactions therewith. This may, for example, assist in the resolution of disputes or the like that result during a specific trip. It may also allow a user to pinpoint the specific incident in their timeline of trips undertaken using such service. The application facilitating operation of the present systems and methods may communicate with an application associated with the specific ride-sharing platform, or the like, to enable recoding of the necessary details.

It should further be noted that the mobile device 112 may display the GUI in a web browser uniquely usable with an application operating on the mobile device and facilitating use of the method, or a web browser that is used for normal browsing on the mobile device and which is launched after other elements of the method have taken place using an application specifically for facilitating operation of the systems and methods of the present disclosure. Similarly, a bespoke or normal web browser may be used to display the content stream and/or an advertisement of the system and methods to a user.

Any of the blocks of a flow diagram or a component in a block diagram may be provided by hardware or by software associated with the specific electronic device, whether the multimedia computer, user's mobile device, or any server. These electronic devices may be embodied by a personal computer, laptop computer, personal digital assistant, smartphone, feature phone, satellite phone, server computer, phablet, tablet, wearable computer, or the like. Appropriate components may form part of such device for the operation of the required method on that device. Further, the electronic devices may be configured to communicate wirelessly or over a wired communication network. The various components forming part of each electronic device may be configured to communicate with each other via an appropriate communication interface, while an appropriate external communication interface may facilitate communication with other electronic devices, whether forming part of the present systems or not.

Notably, the feature of allowing a trusted third party operating an authorization server to authorize a user, without the need for the user to have an account with the content server, is an improvement in authorization technologies serving to identify users for access to restricted content on publicly accessible multimedia computers. The user's information accordingly need not be provided to the content server to allow them to access the restricted content. However, the user's credentials are still confirmed before they are provided with the restricted content, and the content server can trust that those accessing restricted content meet the predetermined criteria required to be authorized. Additionally, if the content server does require the provision of a user's authorization information, the content server may trust that the details are accurate as the details have already been confirmed as accurate by the authorization server.

In addition, by only streaming content for viewing to a multimedia computer, the processing power required by such multimedia computer is reduced. In the above example, the multimedia computer need only show a content feed to a user, with the user's mobile device being used to interact therewith. Also, the interface requirements of such a multimedia computer are reduced by not requiring input to be provided via the multimedia computer.

Figure 7:
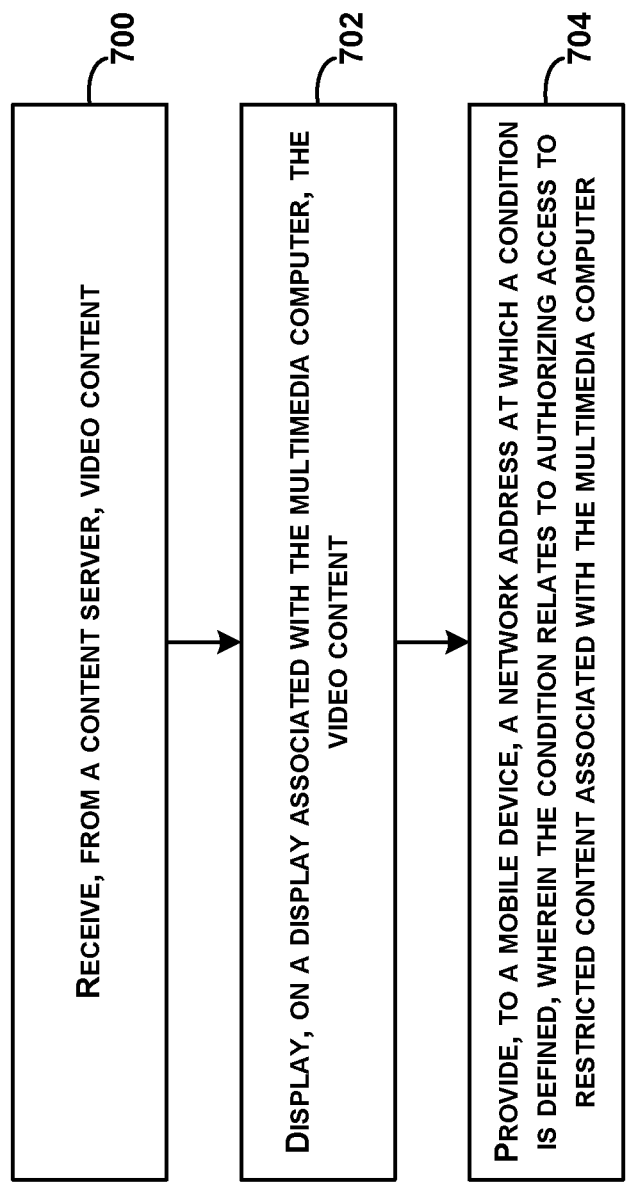
FIG. 7 is a flow chart, in accordance with example embodiments.

FIG. 7 depicts a flow chart showing a set of operations that can, for example, be carried out using a multimedia computer, such as the multimedia computer 102 of FIG. 1. Several of the operations described in connection with FIG. 7 are similar to operations described in connection with FIGS. 6A-6D. As such, variations of the operations described in connection with FIGS. 6A-6D are likewise applicable to the operations described in connection with FIG. 7. However, for the sake of brevity, these variations are not repeated.

Initially, block 700 includes receiving, from a content server, video content. In some embodiments, the video content is a content stream. Further, in some embodiments, the multimedia computer is located in a public transportation vehicle, such as a taxi.

Block 702 includes displaying, on a display associated with the multimedia computer, the video content.

Block 704 includes providing, to a mobile device, a network address at which a condition is defined, the condition relating to authorizing access to restricted content associated with the multimedia computer. In some embodiments, the network address is a website address where an authorization process may be initiated and where a GUI may be accessed that may allow a user to interact with the video content. In some embodiments, the network address is provided in the form of an optical code, such as a QR code, and the mobile device may scan the optical code using a scanner in order to retrieve the network address. Alternatively, an encrypted version of the network address can be captured from an RFID tag, such as an NFC tag, or it may be provided in a normal text format, and may be scanned or simply copied by the user and entered into the mobile device. The optical code can be included in the video content and displayed as part thereof.

In some embodiments, the content server and the multimedia computer are located remotely from each other. Accordingly, communication between the content server and the multimedia computer may include communication over a communication network.

Figure 8:
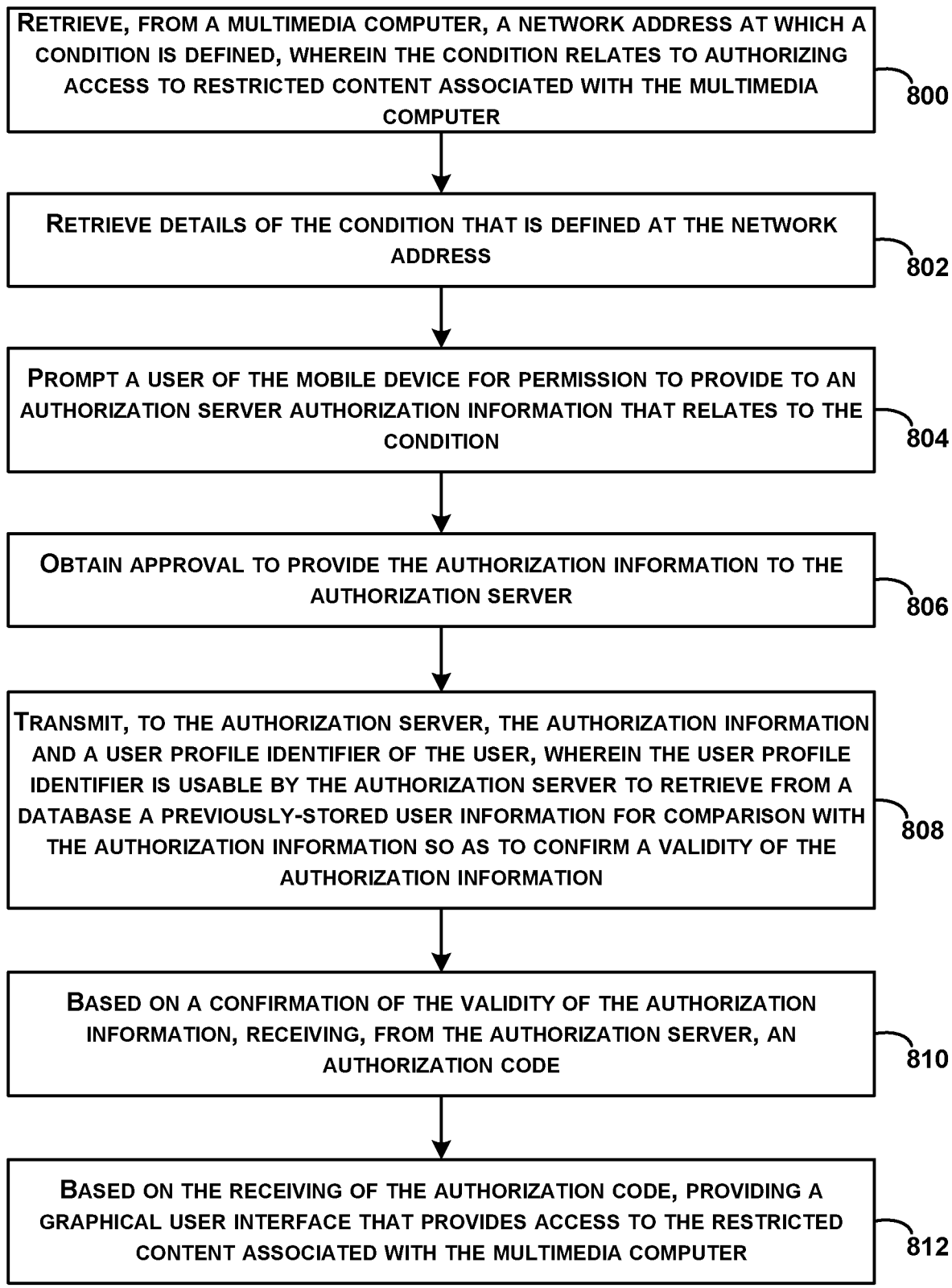
FIG. 8 is another flow chart, in accordance with example embodiments.

FIG. 8 depicts a flow chart showing a set of operations that can, for example, be carried out using a mobile device, such as the mobile device 112 of FIG. 1. Several of the operations described in connection with FIG. 8 are similar to operations described in connection with FIGS. 6A-6D. As such, variations of the operations described in connection with FIGS. 6A-6D are likewise applicable to the operations described in connection with FIG. 8. However, for the sake of brevity, these variations are not repeated.

Initially, block 800 includes retrieving, from a multimedia computer, a network address at which a condition is defined, the condition relating to authorizing access to restricted content associated with the multimedia computer. In some embodiments, retrieving the network address includes capturing an encrypted version of the network address using a scanner associated with the mobile device, and decrypting the encrypted version so as to reveal the network address. The encrypted version can be provided by an optical code, such as a QR code. Alternatively, the encrypted version can be provided by an RFID tag, such as an NFC tag. In some embodiments, the multimedia computer is located in a vehicle.

Block 802 includes retrieving details of the condition that is defined at the network address.

Block 804 includes prompting a user of the mobile device for permission to provide to an authorization server authorization information that relates to the condition. In some embodiments, prompting the user of the mobile device for permission includes displaying a prompt on a display of the mobile device. The prompt can include details of the condition and an identity of a party requesting the authorization information.

Block 806 includes obtaining approval to provide the authorization information to the authorization server. In some embodiments, the authorization information is an attestation.

Block 808 includes transmitting, to the authorization server, the authorization information and a user profile identifier of the user. The user profile identifier is usable by the authorization server to retrieve from a database previously-stored user information for comparison with the authorization information so as to confirm a validity of the authorization information. In some embodiments, the authorization server is operated by a self-sovereign identity provider, and the database is a decentralized ledger.

Block 810 includes, based on a confirmation of the validity of the authorization information, receiving, from the authorization server, an authorization code.

Block 812 includes, based on the receiving of the authorization code, providing a graphical user interface that provides access to the restricted content associated with the multimedia computer. In some embodiments, the condition is a minimum-age restriction, and the restricted content includes a functionality of the GUI that is age-restricted. In some embodiments, the condition is membership with a streaming service. In some embodiments, as soon as the authorization code is received, a display of the mobile device is updated to show the user the GUI.

Additional blocks not illustrated in FIG. 8 can include transmitting, to a content server, the authorization code. The content server can provide video content to the multimedia computer.

Further, additional blocks not illustrated in FIG. 8 can include (i) obtaining, by way of the GUI, user input; (ii) transmitting, to a content server, instructions corresponding to the user input; (iii) receiving, from the content server, GUI update information; and (iv) updating the GUI in accordance with the GUI update information. The content server can provide video content to the multimedia computer.

In some embodiments, the authorization server, the content server, and the mobile device are located remotely from one another. Accordingly, communication between the authorization server, the content server, and the mobile device may include communication over a communication network.

Figure 9:
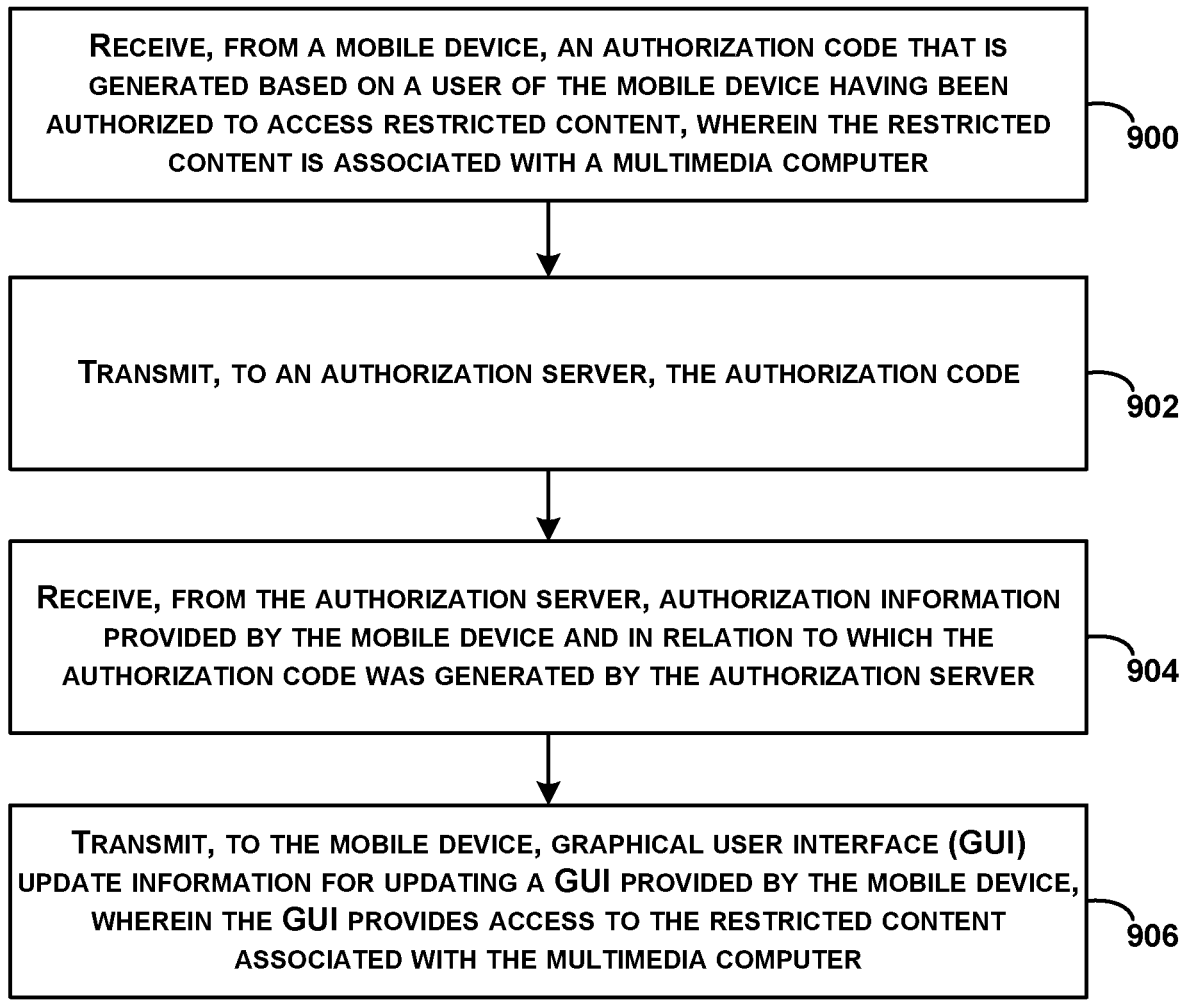
FIG. 9 is yet another flow chart, in accordance with example embodiments.

FIG. 9 depicts a flow chart showing a set of operations that can, for example, be carried out using a server device, such as the content server 106 of FIG. 1. Several of the operations described in connection with FIG. 9 are similar to operations described in connection with FIGS. 6A-6D. As such, variations of the operations described in connection with FIGS. 6A-6D are likewise applicable to the operations described in connection with FIG. 9. However, for the sake of brevity, these variations are not repeated.

Initially, block 900 includes receiving, from a mobile device, an authorization code that is generated based on a user of the mobile device having been authorized to access restricted content, the restricted content being associated with a multimedia computer. In some embodiments, the multimedia computer is located in a vehicle.

Block 902 includes transmitting, to an authorization server, the authorization code. In some embodiments, the authorization server is operated by a self-sovereign identity provider.

Block 904 includes receiving, from the authorization server, authorization information provided by the mobile device and in relation to which the authorization code was generated by the authorization server.

Block 906 includes transmitting, to the mobile device, GUI update information for updating a GUI provided by the mobile device. The GUI provides access to the restricted content associated with the multimedia computer. In some embodiments, the restricted content includes a functionality of the GUI that is age-restricted. In some embodiments, the restricted content includes video content that is available to members of a streaming service.

Additional blocks not illustrated in FIG. 9 can include (i) receiving, from the mobile device, instructions for interacting with video content provided for display on the multimedia computer; (ii) determining, based on the instructions, additional GUI update information for updating the GUI; and (iii) transmitting, to the mobile device, the additional GUI update information.

In some embodiments, the authorization server, the content server, and the mobile device are located remotely from one another. Accordingly, communication between the authorization server, the content server, and the mobile device may include communication over a communication network.

Figure 10:
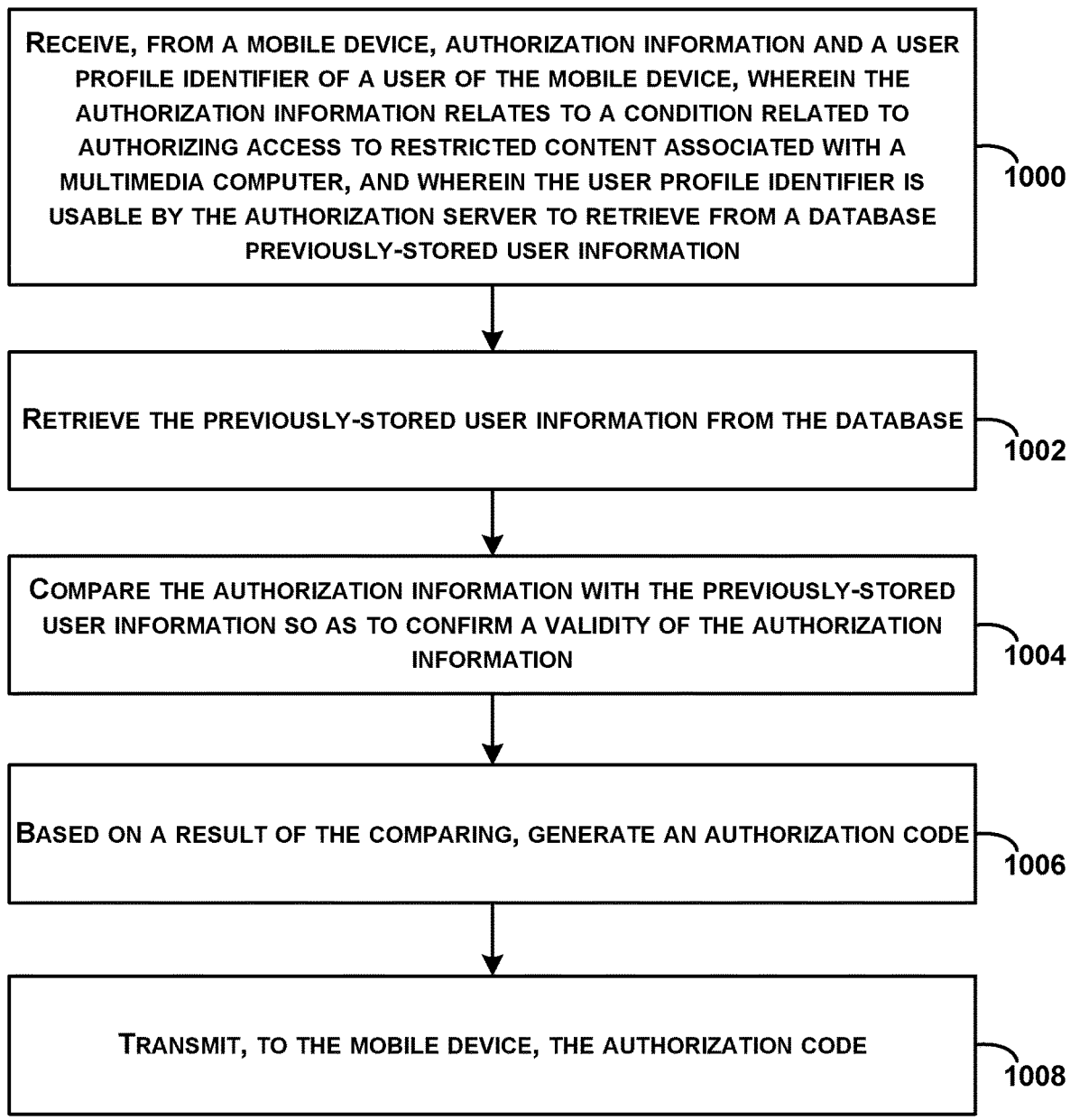
FIG. 10 is yet another flow chart, in accordance with example embodiment.

FIG. 10 depicts a flow chart showing a set of operations that can, for example, be carried out using a server device, such as the authorization server 110 of FIG. 1. Several of the operations described in connection with FIG. 10 are similar to operations described in connection with FIGS. 6A-6D. As such, variations of the operations described in connection with FIGS. 6A-6D are likewise applicable to the operations described in connection with FIG. 10. However, for the sake of brevity, these variations are not repeated.

Initially, block 1000 includes receiving, from a mobile device, authorization information and a user profile identifier of a user of the mobile device. The authorization information relates to a condition related to authorizing access to restricted content associated with the multimedia computer. The user profile identifier is usable the by the authorization server to retrieve from a database previously-stored user information. In some embodiments, the condition includes a minimum-age restriction. In some embodiments, the condition includes membership with a streaming service. In some embodiments, the authorization server is operated by a self-sovereign identity provider, and the database is a decentralized ledger. In some embodiments, the multimedia computer is located in a vehicle.

Block 1002 includes retrieving the previously-stored user information from the database.

Block 1004 includes comparing the authorization information with the previously-stored user information so as to confirm a validity of the authorization information.

Block 1006 includes, based on a result of the comparing, generating an authorization code.

Block 1008 includes transmitting, to the mobile device, the authorization code.

Additional blocks not illustrated in FIG. 10 can include (i) storing, in a memory component, the authorization code in association with the authorization information; (ii) receiving, from a content server, the authorization code; (iii) retrieving the authorization information from the memory component using the authorization code; and (iv) transmitting, to the content server, the authorization information. The content server can provide video content to the multimedia computer.

In some embodiments, the authorization server, the content server, and the mobile device are located remotely from one another. Accordingly, communication between the authorization server, the content server, and the mobile device may include communication over a communication network.

IV. Conclusion

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the invention can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A computer-implemented method comprising:
retrieving, by a mobile device and from a multimedia computer that displays a content stream, a network address at which a condition is defined, wherein the condition relates to authorizing access to restricted content associated with the multimedia computer and wherein the restricted content comprises a functionality of a graphical user interface (GUI) provided by the mobile device, and wherein the functionality of the GUI allows a user of the mobile device to interact with the content stream that the multimedia computer displays;
retrieving, by the mobile device, details of the condition that is defined at the network address upon navigating to the network address;
prompting, by the mobile device, a user of the mobile device for permission to provide to an authorization server authorization information that relates to the condition;
obtaining, by the mobile device from the user of the mobile device, approval to provide the authorization information to the authorization server;
transmitting, by the mobile device to the authorization server, the authorization information and a user profile identifier of the user, wherein the user profile identifier is usable by the authorization server to retrieve from a database previously-stored user information for comparison with the authorization information so as to confirm a validity of the authorization information;
based on a confirmation of the validity of the authorization information, receiving, by the mobile device from the authorization server, an authorization code; and
based on the receiving of the authorization code, providing, by the mobile device, the functionality of the GUI that allows the user of the mobile device to interact with the content stream that the multimedia computer displays.

2. The computer-implemented method of claim 1, wherein retrieving the network address comprises:
capturing an encrypted version of the network address using a scanner associated with the mobile device; and
decrypting the encrypted version so as to reveal the network address.

3. The computer-implemented method of claim 2, wherein the encrypted version is provided by an optical code.

4. The computer-implemented method of claim 3, wherein the optical code is a quick-response (QR) code.

5. The computer-implemented method of claim 2, wherein the encrypted version is provided by a radio frequency identification (RFID) tag.

6. The computer-implemented method of claim 5, wherein the RFID tag is a near-field communication (NFC) tag.

7. The computer-implemented method of claim 1, wherein the condition comprises a minimum-age restriction.

8. The computer-implemented method of claim 7, wherein the restricted content comprises a functionality of the GUI that is age-restricted.

9. The computer-implemented method of claim 1, wherein the condition comprises membership with a streaming service.

10. The computer-implemented method of claim 1, wherein prompting the user of the mobile device for permission comprises displaying a prompt on a display of the mobile device.

11. The computer-implemented method of claim 10, wherein the prompt comprises the details of the condition and an identity of a party requesting the authorization information.

12. The computer-implemented method of claim 1, wherein the authorization server is operated by a self-sovereign identity provider.

13. The computer-implemented method of claim 12, wherein the database is a decentralized ledger.

14. The computer-implemented method of claim 1, wherein the authorization information comprises an attestation.

15. The computer-implemented method of claim 1, further comprising transmitting, by the mobile device to a content server, the authorization code, wherein the content server provides video content to the multimedia computer.

16. The computer-implemented method of claim 1, further comprising: obtaining, by the mobile device by way of the GUI, user input;
transmitting, by the mobile device to a content server, instructions corresponding to the user input, wherein the content server provides video content to the multimedia computer;
receiving, by the mobile device from the content server, GUI update information; and updating, by the mobile device, the GUI in accordance with the GUI update information.

17. The computer-implemented method of claim 1, wherein the multimedia computer is located in a vehicle.

18. The computer-implemented method of claim 1 further comprising:
interacting with, via the GUI, the content stream that the multimedia computer displays, wherein:
the content stream includes a video feed on which a wager can be placed, and
interacting with the content stream includes selecting when and what size or type of a wager to place.

19. The computer-implemented method of claim 18, further comprising:
requesting, by the mobile device, the user to enter payment information for placing the wager; and
transmitting, by the mobile device to a content server, the payment information for placing the wager.

20. The computer-implemented method of claim 18, wherein the video feed includes a simulation of a gambling event, a simulation of a table game, or a live sports event.

21. The computer-implemented method of claim 18, wherein the functionality of the GUI that allows the user of the mobile device to interact with the content stream that the multimedia computer displays allows for playing, pausing, skipping forward, skipping backwards, and/or selecting a video to view.

22. The computer-implemented method claim 1, wherein providing the functionality of the GUI that allows the user of the mobile device to interact with the content stream that the multimedia computer displays includes displaying the GUI at the mobile device, and/or receiving GUI update information at the mobile device.

23. An article of manufacture including a non-transitory computer-readable medium, having stored thereon program instructions that, upon execution by a processor, cause a mobile device to perform operations comprising:
retrieving, from a multimedia computer that displays a content stream, a network address at which a condition is defined, wherein the condition relates to authorizing access to restricted content associated with the multimedia computer and wherein the restricted content comprises a functionality of a graphical user interface (GUI) provided by the mobile device, and wherein the functionality of the GUI allows a user of the mobile device to interact with the content stream that the multimedia computer displays;
retrieving details of the condition that is defined at the network address upon navigating to the network address;
prompting a user of the mobile device for permission to provide to an authorization server authorization information that relates to the condition;
obtaining, from the user of the mobile device, approval to provide the authorization information to the authorization server;
transmitting, to the authorization server, the authorization information and a user profile identifier of the user, wherein the user profile identifier is usable by the authorization server to retrieve from a database previously-stored user information for comparison with the authorization information so as to confirm a validity of the authorization information;
based on a confirmation of the validity of the authorization information, receiving, from the authorization server, an authorization code; and
based on the receiving of the authorization code, providing the functionality of the GUI that allows the user of the mobile device to interact with the content stream that the multimedia computer displays.

24. The article of manufacture of claim 23, wherein retrieving the network address comprises:
capturing an encrypted version of the network address using a scanner associated with the mobile device; and
decrypting the encrypted version so as to reveal the network address.

25. A mobile device comprising:

a processor;

a memory component; and program instructions, stored in the memory component, that upon execution by the processor, cause the mobile device to perform operations comprising:

retrieving, from a multimedia computer that displays a content stream, a network address at which a condition is defined, wherein the condition relates to authorizing access to restricted content associated with the multimedia computer and wherein the restricted content comprises a functionality of a graphical user interface (GUI) provided by the mobile device, and wherein the functionality of the GUI allows a user of the mobile device to interact with the content stream that the multimedia computer displays;

retrieving details of the condition that is defined at the network address upon navigating to the network address;

prompting a user of the mobile device for permission to provide to an authorization server authorization information that relates to the condition;

obtaining, from the user of the mobile device, approval to provide the authorization information to the authorization server;

transmitting, to the authorization server, the authorization information and a user profile identifier of the user, wherein the user profile identifier is usable by the authorization server to retrieve from a database previously-stored user information for comparison with the authorization information so as to confirm a validity of the authorization information;

based on a confirmation of the validity of the authorization information, receiving, from the authorization server, an authorization code; and based on the receiving of the authorization code, providing the functionality of the GUI that allows the user of the mobile device to interact with the content stream that the multimedia computer displays.

* * * * *